United States Patent
Taguchi et al.

[11] Patent Number: 5,959,942
[45] Date of Patent: Sep. 28, 1999

[54] METHOD AND APPARATUS FOR READING A MAGNETO-OPTICAL RECORDING MEDIUM WITH ASYMMETRICAL EDGES

[75] Inventors: Masakazu Taguchi; Akihiro Itakura; Ken Tamanoi, all of Kawasaki, Japan

[73] Assignee: Fujitsu Limited, Kawasaki, Japan

[21] Appl. No.: 08/840,407

[22] Filed: Apr. 29, 1997

[30] Foreign Application Priority Data

Dec. 17, 1996 [JP] Japan ............... 8-337372

[51] Int. Cl.⁶ .................... G11B 11/00
[52] U.S. Cl. .................... 369/13; 369/54; 369/59
[58] Field of Search .................... 369/13, 54, 58, 369/59, 126, 32, 44.34, 44.26, 44.35, 110, 100, 109, 47, 275.2; 360/59, 114

[56] References Cited

U.S. PATENT DOCUMENTS 5,648,949  7/1997  Miyamoto et al. ............ 369/59
5,754,522  5/1998  Kobayashi et al. ............ 369/275.3

FOREIGN PATENT DOCUMENTS

| 1 143041 | 6/1989 | Japan . |
| 3 93058 | 4/1991 | Japan . |
| 7 244877 | 9/1995 | Japan . |
| 73 26087 | 12/1995 | Japan . |
| 8 7350 | 1/1996 | Japan . |

Primary Examiner—Ali Neyzari
Attorney, Agent, or Firm—Greer, Burns & Crain, Ltd.

[57] ABSTRACT

A reading method and reading apparatus for a magneto-optical recording medium designed to modulate an applied magnetic field. The magnetic field corresponds to the leading and trailing edges of a reproduction signal so that when reading data a magnetic field may be applied in a direction of steep inclination of the edges of the waveform of the reproduction signal.

7 Claims, 17 Drawing Sheets

METHOD AND APPARATUS FOR READING A MAGNETO-OPTICAL RECORDING MEDIUM WITH ASYMMETRICAL EDGES

BACKGROUND OF THE INVENTION

The present invention relates to a reading method and reading apparatus of magneto-optical recording medium, and more particularly to a reading method and reading apparatus of magneto-optical recording medium capable of reading at magnetically induced super resolution (MSR).

The magneto-optical disk and its recording and reading apparatus are rapidly expanding in the market owing to the large capacity, reloadability and high reliability of the devices. With such apparatus, good recording reading of picture, image information, and computer code information are realized. It is desired to increase further the memory capacity of such magneto-optical disk. To increase the recording density, it is necessary to form more record marks on the medium, and it is hence needed to set the recording mark length shorter than the spot diameter of the laser beam, and fill in recording mark gaps. The recording density of recording marks in magneto-optical recording and reading is limited by the spot diameter of the light beam for irradiating the disk. It is relatively easy to form a fine recording mark having a period shorter than the spot diameter, but there was a limit to the length of the recording mark that can be reproduced, due to restriction of the wavelength $\lambda$ the laser beam to irradiate, and the numerical aperture NA of the objective lens when reproducing a fine recording mark.

Accordingly, by making use of the temperature distribution of the medium produced in the spot of the light beam, and reading out the recording marks (bits) from part of a region in the spot, the MSR reading method and MSR medium in which the spot diameter is reduced are proposed in Japanese Patent Application Laid-Open Nos. 1-143041 (1989), 3-93058 (1991), etc. The former is a magneto-optical reading method of emitting the light beam while applying a reading magnetic field to a magneto-optical disk of multi-layer structure laminating a reading layer, a switch layer, and a recording layer on a substrate. In reading, a temperature distribution is formed in the beam spot due to rotation of the magneto-optical disk, and a high temperature region and a low temperature region are formed. In the low temperature region, by the exchange coupling force between the recording layer and reading layer through the switch layer, bits of the recording layer are transferred to the reading layer and read out. In the high temperature region, since the exchange coupling force between the recording layer and reading layer is cut off, the magnetization of the reading layer is aligned in the direction of the reading magnetic field, and the bits in the recording layer are masked. As a result, the bits are reproduced only from the low temperature region in the spot (FAD system), and the reading resolution is enhanced that same as when the beam spot is substantially reduced.

FIG. 1 is a diagram showing the film composition of the MSR medium proposed in the latter Japanese Patent Application Laid-Open No. 3-93058 (1991), and the state of magnetization when reproducing. This is a method of magneto-optical reading for emitting a light beam while applying an initial magnetic field and a reading magnetic field Hr to a magneto-optical disk of multi-layer structure laminating a reading layer 41, a reading auxiliary layer 42, an intermediate layer 43, and a recording layer 44 on a substrate (not shown). When reproducing, by rotation of the magneto-optical disk, a temperature distribution occurs in the beam spot S, and a high temperature region, a low temperature region, and an intermediate temperature region between them are formed. In the low temperature region, since the intermediate layer 43 has an in-plane magnetization characteristic, the exchange coupling force between the recording layer 44 and the reading layer 41 is cut off. The magnetization of the reading layer 41 is aligned in the direction of the initializing magnetic field, and the bits of the recording layer 44 are masked (front mask). In the high temperature region, the reading auxiliary layer 42 exceeds the Curie temperature, and the exchange coupling force between the recording layer 44 and reproducing layer 41 is cut off. The magnetization of the reading layer 41 is aligned in the direction of the reading magnetic field, so that the bits of the recording layer 44 are masked (rear mask).

In the intermediate temperature region, the intermediate layer 43 has a perpendicular magnetization characteristic, and the bits of the recording layer 44 are transferred to the reading layer 41 through the intermediate layer 43 and the reading auxiliary layer 42, and read out (the opening). As a result, the bit is reproduced only from the intermediate temperature region in the beam spot S. The result and is substantially the same as when the beam spot is reduced, and reading resolution is enhanced (RAD double mask system).

In the MSR reading method proposed in Japanese Patent Application Laid-Open No. 3-93058 (1991), it was necessary to align the magnetization of the reading layer 41 and the reading auxiliary layer 42 in the same direction by applying an initializing magnetic field of several kOe to the magneto-optical disk by an initializing magnet 45. This is because the coercive force of the reading layer 41 and the reading auxiliary layer 42 is larger than the exchange coupling force from the recording layer 44 through the intermediate layer 43 in the low temperature region. In the transfer region which is the intermediate temperature region, along with elevation of temperature of the magneto-optical disk, the magnitude relation is reversed, so that an exchange coupling force acts.

FIG. 2 is a block diagram showing a construction of a conventional magneto-optical reading apparatus. In the diagram, reference numeral 16 is a magneto-optical disk, which is an MSR medium of the RAD double mask system as mentioned above. In the magneto-optical disk 16, a recording mark is formed by using a laser pulse magnetic field modulation recording system. The laser pulse magnetic field modulation recording system is a kind of magnetic field modulation recording, and is a recording method of emitting laser beam generating pulses, while applying a magnetic field modulated on the basis of the information to be recorded. By these recording methods, finer recording marks can be formed.

An optical head 2 is disposed at one side of such magneto-optical disk 16. The optical head 2 has a laser light source, an optical system for guiding the laser beam emitted from the laser light source, and converting means for converting the magneto-optical signal into an electric signal. On other side of the magneto-optical disk 16, a magnetic coil 3 is disposed, and a reading magnetic field in predetermined direction is applied to the magneto-optical disk 16 by the signal given from a magnetic coil driving circuit 4. The laser beam emitted from the optical head 2 irradiates the magneto-optical disk 16, and its reflected light is condensed, and a magneto-optical signal is detected, and is converted into a reading signal which is an electric signal.

The reading signal produced from the optical head 2 is put into an amplifier 5 and amplified, and is put out into an AGC (automatic gain control) circuit 6. The gain of the signal put in the AGC circuit 6 is adjusted, and is delivered into an equalizer 7. The waveform is equalized, and the waveform equalized signal is put out into an LPF (low pass filter) 8, and high frequency noise is removed. The signal from the LPF 8 is sent out into a binary circuit 9 to be transformed into a binary signal, and it is further put out into a data discriminator 10 and a PLL (phase locked loop) 11. The binary signal entering the data discriminator 10 receives the signal issued from the PLL 11, and separate data and clock signals are put into a demodulator 12. The entered separate data is demodulated in the demodulator 12. In this way, the information recorded in the magneto-optical disk 16 is reproduced.

FIG. 3 and FIG. 4 are diagrams showing the recording mark formed in the magneto-optical disk 16, and the waveforms of reproduction signals obtained by applying reading magnetic fields of minus magnetic field and plus magnetic field, displaying the phase distributions of both the leading edge and trailing edge of the waveform of reproduction signal. In the recording mark, the bit of which magnetizing direction is the recording direction is indicated by hatching. The slope of the edge of the reproduction signal in such MSR reading is steep as compared with the case of ordinary reading in which all regions of the beam spot S are in the opening. In this case the jitter of the binary signal to the same noise power is small, because in MSR reading, the bit is read out only in part of the region close to the middle of the beam spot S, and the reproduction signal is obtained, corresponding to the light intensity near the middle of the Gaussian distribution of the beam spot S.

The inventors discovered that the magnet-optical disk 16 described above has reproductions characteristics which will now be described.

FIG. 3 and FIG. 4 show the effects of setting the direction of reading magnetic field in the reverse direction (minus magnetic field) to the recording direction and the same direction (plus magnetic direction). When the minus magnetic field is applied, the waveform of the reproduction signal is moderate in the inclination of the leading edge as compared with the inclination of the trailing edge, as shown in FIG. 3. When the reading magnetic field in the plus magnetic field is applied, as shown in FIG. 4, the inclination of the trailing edge is moderate as compared with the inclination of the leading edge. This is due to the difference in the forming ranges of the front mask and rear mask in the beam spot S. The inclination is steeper in the edge of the mask forming in the range close to the middle of the beam spot S.

Also shown FIG. 3 and FIG. 4 are the edge phase distributions. The edge phase distribution expresses the phase deviation due to noise contained in the reproduction signal, showing the magnitude of the jitter. When the minus magnetic field is applied, the phase distribution of the leading edge is wider than that of the trailing edge of the reproduction signal, and the jitter is larger. When the plus magnetic field is applied, the phase distribution is wider in the trailing edge than in the leading edge, and the jitter is larger.

FIG. 5 is a graph showing the jitter characteristic relative to the recording density of the magneto-optical disk. The ordinates denotes the jitter, and the abscissas represents the dimension of the recording mark. As shown in the graph, as the recording mark becomes smaller, that is, as the recording density becomes higher, the jitter becomes larger in both leading edge and trailing edge. Since the reproduction signal is determined by the average of the jitter of the leading edge and the trailing edge, as shown in FIG. 3 and FIG. 4, if the jitter of one edge is large, this jitter has a large effect on the quality of the reproduction signal. In particular, in a high recording density medium such as MSR medium, the reproduction signal asymmetrical in edge is extremely deteriorates to quality.

BRIEF SUMMARY OF THE INVENTION

The invention is devised in light of the above background, and it is an object of the invention to present a reading method of a magneto-optical recording medium capable of steeply inclining both leading and trailing edges of the waveform of the reproduction signal by modulating and applying a magnetic field when reproducing.

A reading method of magneto-optical recording medium of the invention comprises the step of applying a magnetic field to a magneto-optical recording medium in which data is recorded, the step of emitting a light beam to the region in which the magnetic field is applied and reading out a reproduction signal corresponding to the data, and the step of obtaining the data from the reproduction signal. The magnetic field to be applied is modulated on the basis of the reproduction signal.

It is other object of the invention to present a reading method of the magneto-optical recording medium capable of obtaining a reproduction signal for inclining the leading and trailing edges more steeply. The method includes applying a modulated magnetic field when reading an MSR medium capable of reading out a reproduction signal from a region smaller than beam spot diameter, or an MSR medium of RAD double mask system capable of reading out the reproduction signal from part of the region of the high temperature side in the beam spot.

A reading method of magneto-optical recording medium of the invention comprises the step of causing a temperature distribution in a moving direction in a spot of the light beam by emitting the light beam by a relative move with the magneto-optical recording medium in which data is recorded. The method further includes the step of reading out a reproduction signal from the remaining region in the spot by masking the data in a predetermined region in the spot by application of magnetic field, and the step of obtaining the data from the reproduction signal, wherein the magnetic field is modulated and applied.

According to the reading method of the invention, at the step of reading out the reproduction signal, the data masked region is the lower temperature region and part of higher temperature region in the spot, and the reproduction signal is read out from the remaining higher temperature region.

It is a further object of the invention to present a reading method and reading apparatus of the magneto-optical recording medium capable of obtaining a substantially symmetrical waveform of the reproduction signals with steep inclination of the leading and the trailing edges, by detecting the leading edge and the trailing edge of the reproduction signal being read out, and determining the direction of magnetic field corresponding to each edge.

The reading method of the magneto-optical recording medium of the invention is characterized by detecting the leading edge and the trailing edge of the waveform of the reproduction signal being read out, and modulating the direction of the magnetic field in accordance with the detection of each edge.

Therefore, by applying a plus magnetic field at the time of output of the leading edge and applying a minus magnetic field at the time of output of the trailing edge, the inclination of the both edges may become symmetrical. That is, by magneto-optical reproduction by changing over the reading magnetic field from a plus magnetic field to a minus magnetic field, or vice versa, in accordance with the detection of the leading and trailing edges of the obtained reproduction signal, a reproduction signal of high quality and low jitter at both edges can be obtained.

A reading apparatus of the magneto-optical recording medium of the invention has a magnetic field applying means for applying a magnetic field to a magneto-optical recording medium in which data is recorded. Further included is an optical head for emitting a light beam, condensing a reflected light of the light beam reflected on the magneto-optical recording medium, and converting into a reproduction signal corresponding to the data. Also included is an edge detecting circuit for detecting the leading edge and the trailing edge of the waveform of the reproduction signal by receiving the reproduction signal obtained from the optical head, and a magnetic field modulation instruction circuit for giving an instruction signal for instructing modulation of magnetic field in accordance with detection of each edge to the magnetic field applying means.

Therefore, by including the magnetic field modulation instruction circuit in the edge detecting circuit for instructing a magnetic field modulation at the detection of an edge of the reproduction signal, for example, the leading edge of the reproduction signal is obtained by applying a magnetic field in the same direction as the recording direction, and the magnetic field applying means is instructed to invert the applied magnetic field at the moment of detection of the leading edge. Further, the trailing edge is obtained by application of magnetic field in reverse direction of the recording direction, so that the magnetic field can be applied in direction to reduce jitter for each edge, thereby enhancing the reproduction characteristic.

It is a further object of the invention to present a reading method and a reading apparatus of the magneto-optical recording medium capable of accurately detecting the edge of reproduction signal by masking the fluctuation of the reproduction signal occurring at the moment of zero magnetic field of the modulation magnetic field.

The reading method of magneto-optical recording medium of the invention is characterized by masking the fluctuation of the reproduction signal occurring at the moment of zero magnetic field of the applied modulation magnetic field when detecting the leading edge and the trailing edge.

In the reading apparatus of the magneto-optical recording medium of the invention, the magnetic field modulation instruction circuit has a circuit for generating a signal for masking the fluctuation of the reproduction signal occurring at the moment of zero magnetic field of the applied modulation magnetic field when a signal from the edge detecting circuit is entered.

Therefore, when the modulation magnetic field is applied, gritty component or similar fluctuation occurs in the reproduction signal at the moment of zero magnetic field. The magnetic field modulation instruction circuit therefor, a circuit for generating a signal to prevent a signal instructing modulation of the magnetic field from being delivered under the effect of the gritty component, for a predetermined period from output of this signal, or a signal having the gritty component removed from the reproduction signal. It hence prevents faulty output of the signal for instructing modulation of magnetic field under the influence of fluctuation of reproduction signal.

The above and further objects and features of the invention will more fully be apparent from the following detailed description with accompanying drawings.

DETAILED DESCRIPTION OF THE INVENTION

Figure 6A:
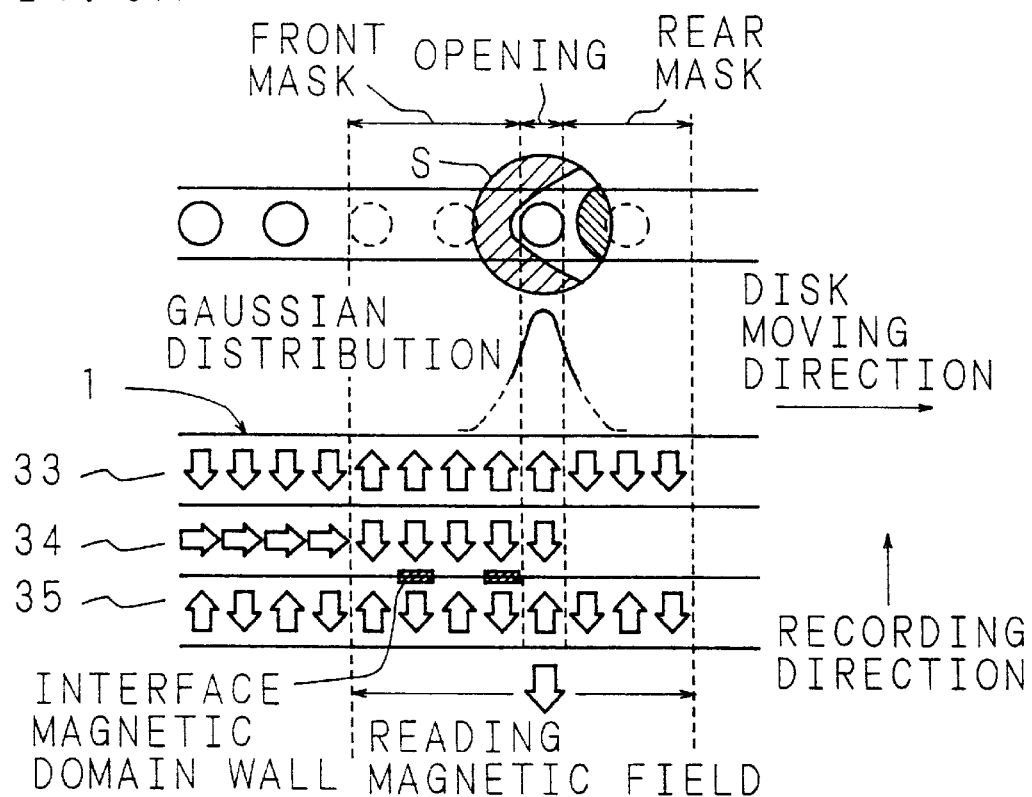
FIG. 6A and FIG. 6B are diagrams showing the state of magnetization at the time of reproduction of the MSR medium according to the proposal of the present applicant.
Figure 6B:
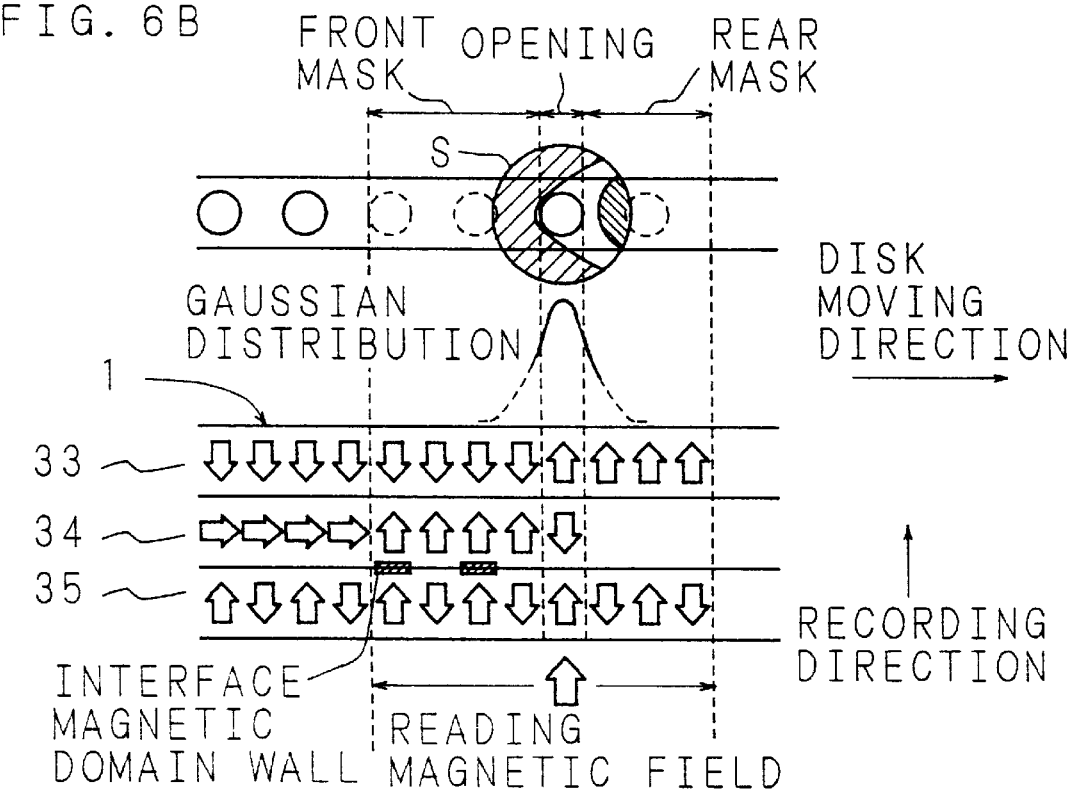

The, the principle of the invention is described below. The present applicant proposed a magneto-optical medium capable of reproducing at MSR in a RAD double mask system by applying a low reproduction magnetic field of several hundred Oe, without using initializing magnet, in Japanese Patent Application Laid-Open No. 7-244877 (1995). FIGS. 6A and 6B are diagrams showing the state of magnetization in reproduction of the MSR medium by proposal of the present applicant, together with the film composition. FIG. 6A shows the state of magnetization when applying a reading magnetic field in reverse direction of recording direction of bit, and FIG. 6B shows the state of magnetization when applying a reading magnetic field in the same direction. In both cases, the substrate of the medium and protective layer and the like are omitted.

Figure 1:
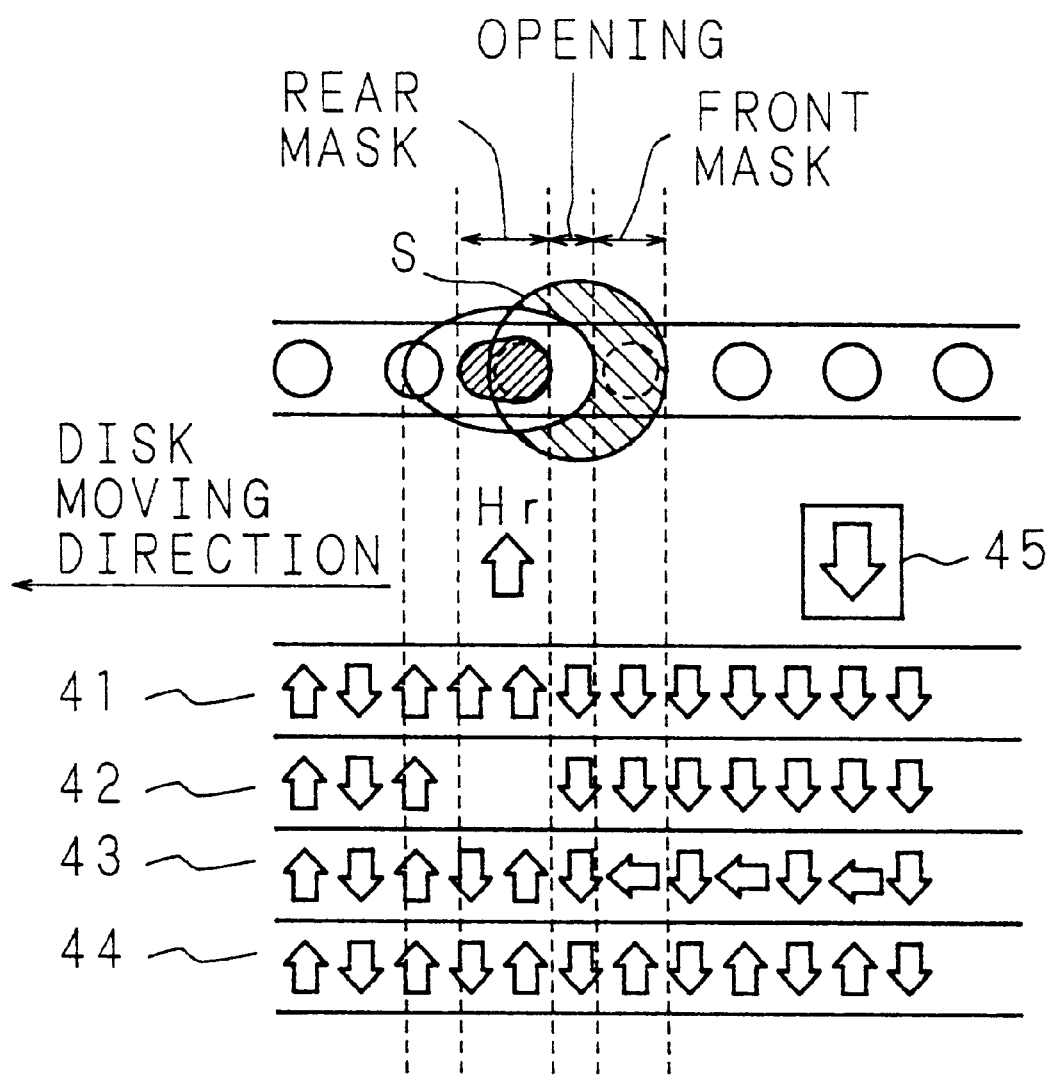
FIG. 1 is a drawing showing film composition of a conventional MSR medium and the state of magnetization at the time of reproduction.
Figure 2:
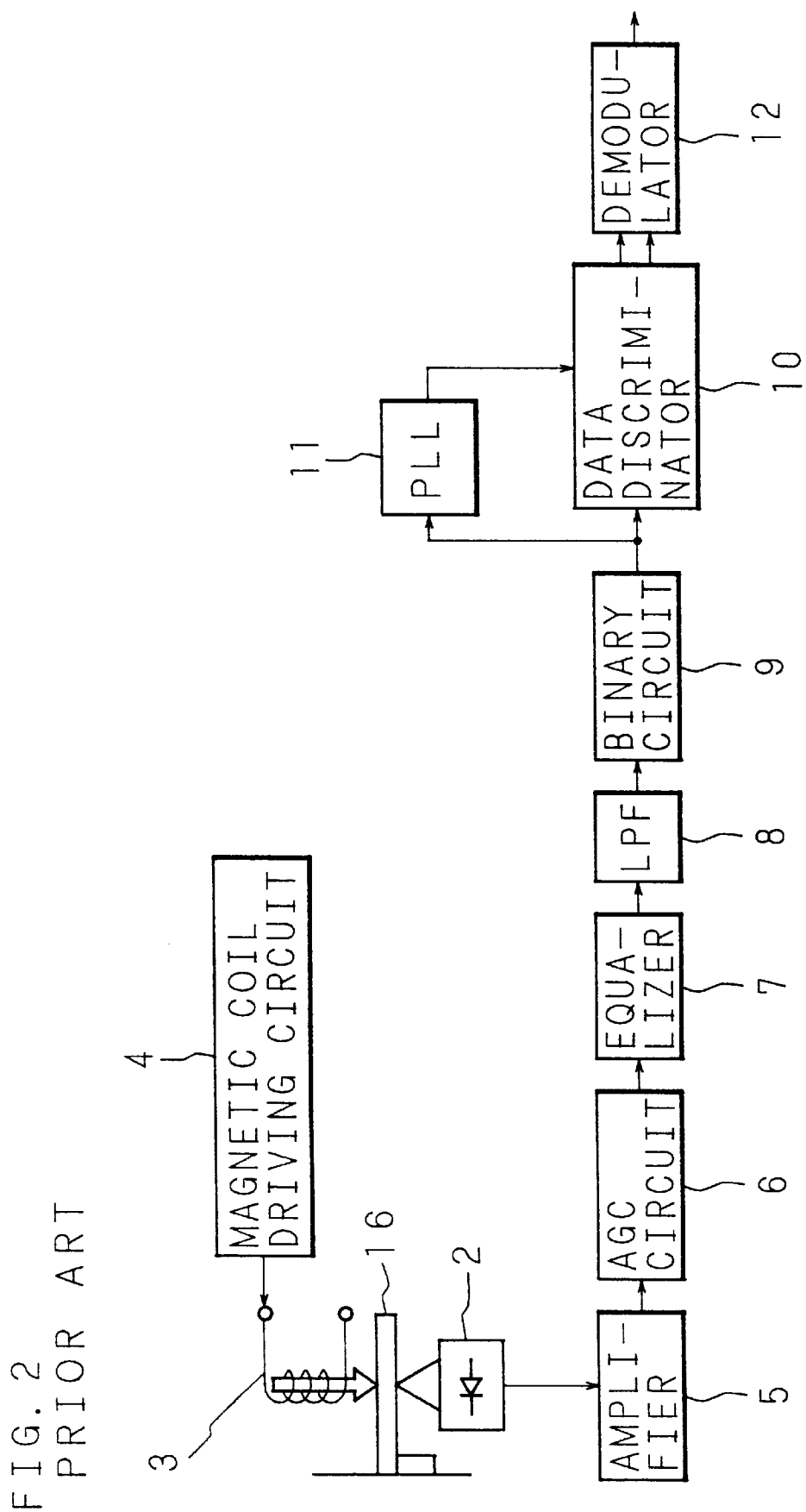
FIG. 2 is a block diagram showing a constitution of a conventional magneto-optical reading apparatus.
Figure 3:
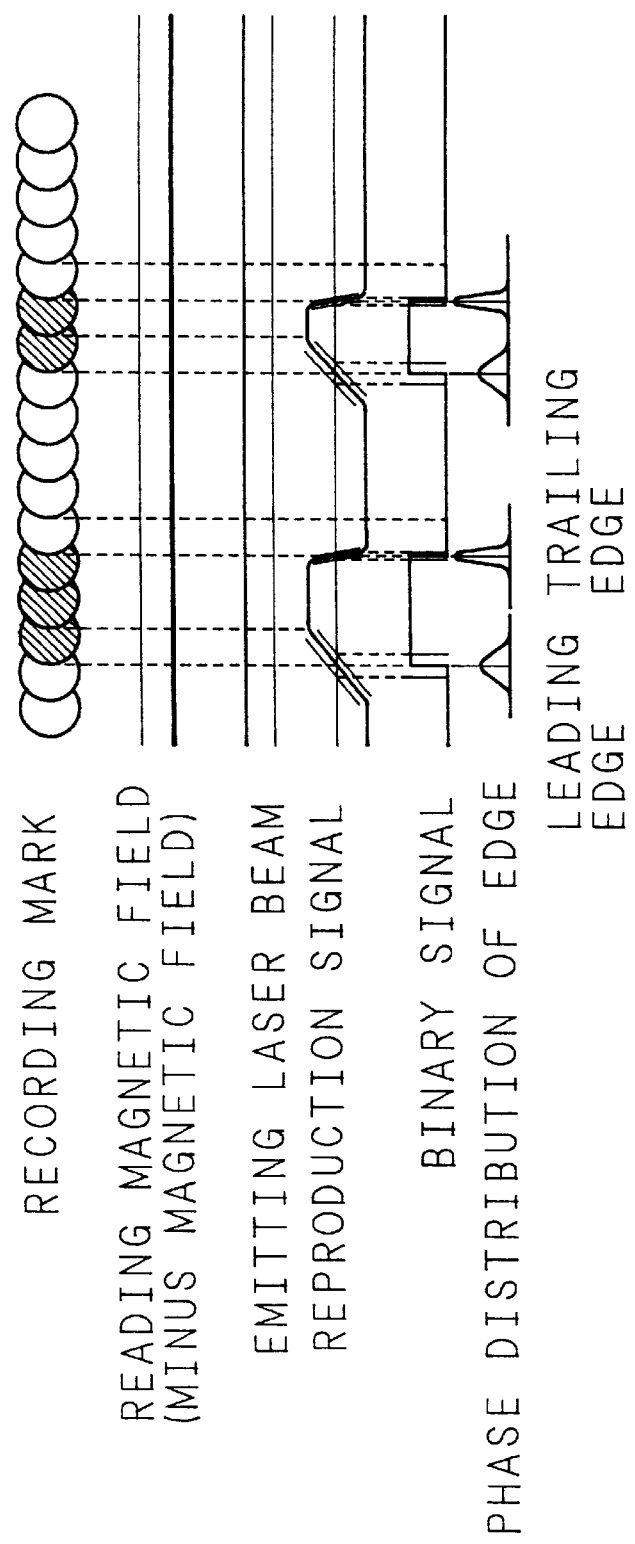
FIG. 3 is a diagram showing a reproduction signal and edge phase distribution about a conventional magnet-optical recording medium (minus magnetic field)
Figure 4:
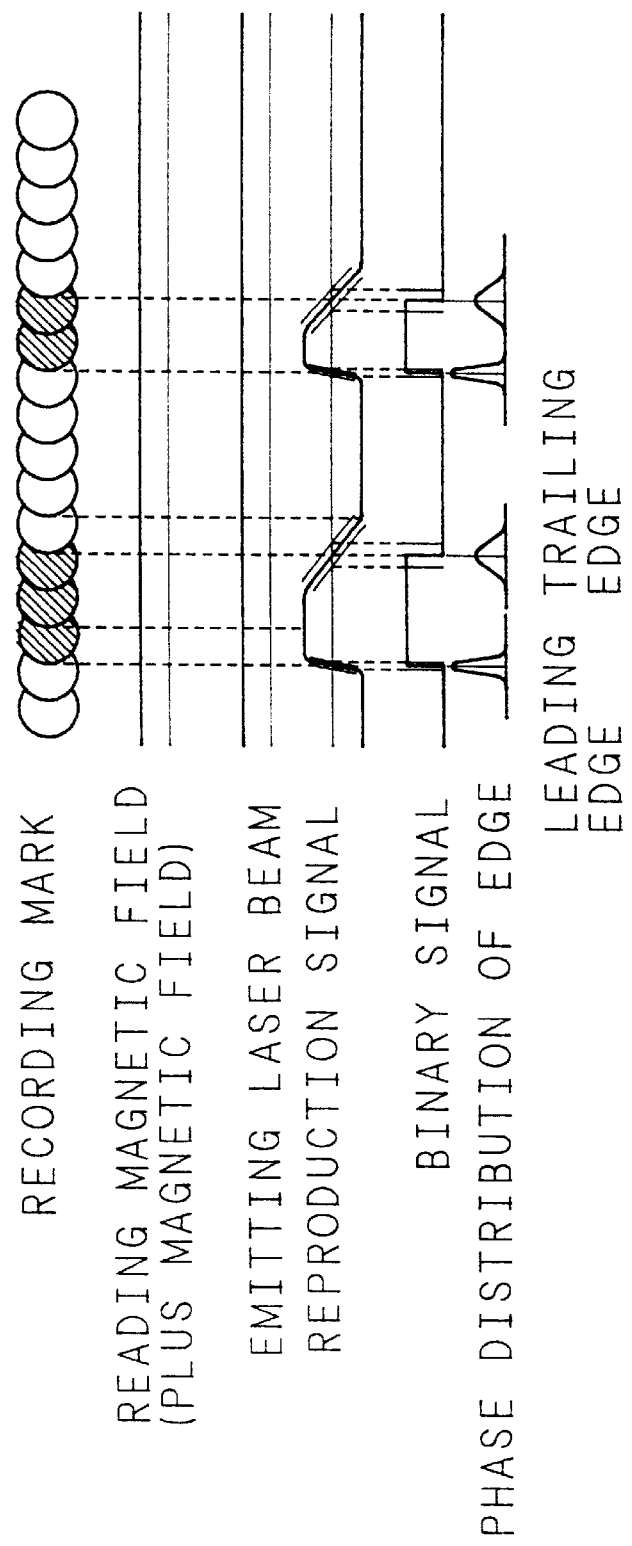
FIG. 4 is a diagram showing a reproduction signal and edge phase distribution about a conventional magnet-optical recording medium (plus magnetic field)
Figure 5:
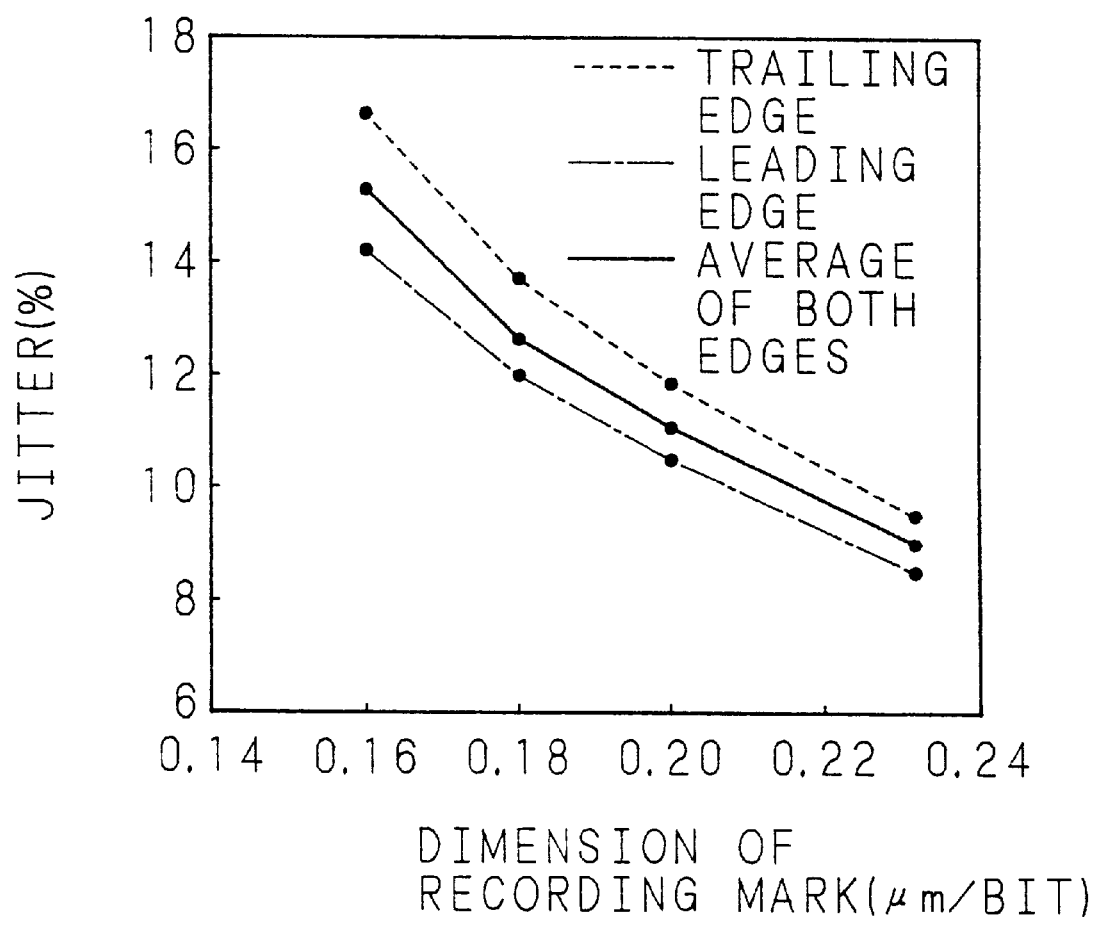
FIG. 5 is a graph showing jitter characteristic in terms of recording density about a conventional magnet-optical recording medium.

As shown in FIGS. 1A and 1B, a magneto-optical disk 1 is formed by laminating a reading layer 33, an intermediate layer 34, and a recording layer 35 in the this order on a substrate (not shown). The reading layer 33 is a transition metal magnetization dominant film, and has an easy axis for magnetization in the perpendicular direction, that is, in the laminating direction. The intermediate layer 34 is a rare earth magnetization dominant film, and has an easy axis for magnetization in the in-plane direction at room temperature (10° C. to 35° C.), and the easy axis for magnetization is changed from the in-plane direction to the perpendicular direction over a specific temperature higher than the room temperature. The recording layer 35 is a transition metal magnetization dominant film, and has an easy axis for magnetization in the perpendicular direction.

When forming a recording mark in the thus composed magneto-optical disk 1, a recording laser beam is emitted while applying a recording magnetic field. There are two methods of recording, optical modulation recording and magnetic field modulation recording, and recording is possible in either method. Supposing the recording direction to be upward, the state of magnetization is explained at the time of reproduction of the magneto-optical disk 1 in which information is recorded. As shown in FIG. 6A, a reading laser beam is emitted to the magneto-optical disk 1, and a downward reading magnetic field (minus magnetic field) reverse to the recording direction is applied in the irradiated region. In the low temperature region which is the forward side of the laser beam, the exchange coupling force is weak between the intermediate layer 34 and the recording layer 35, and the magnetization of the intermediate layer 34 is aligned in the direction of the reading magnetic field, that is, in the downward direction. By the exchange coupling force between the intermediate layer 34 and the reading layer 33, the direction of magnetization of the reading layer 33 is aligned in the upward direction, thereby acting to mask the direction of magnetization of the recording layer 35 (front mask). The high temperature region is a region beyond the Curie temperature of the intermediate layer 34, and the exchange coupling force between the intermediate layer 34 and reading layer 33 is cut off. As a result, the direction of magnetization of the reading layer 33 is aligned in the downward direction of the reading magnetic field, and acts to mask the direction of magnetization of the recording layer 35 (rear mask). In the intermediate temperature region between the low temperature region and the high temperature region, by the exchange coupling force between the recording layer 35 and the reading layer 33 through the intermediate layer 34, the direction of magnetization of the recording layer 35 is transferred to the reading layer 33 (opening).

Moreover, as shown in FIG. 6B, a reading laser beam is emitted to the magneto-optical disk 1, and an upward reading magnetic field (plus magnetic field) reverse to that in FIG. 6A is applied in the emitted region. In the low temperature region, the exchange coupling force between the intermediate layer 34 and the recording layer 35 is weak, and the magnetization of the intermediate layer 34 is aligned in the direction of reading magnetic field, that is, in the upward direction. By the exchange coupling force between the intermediate layer 34 and the reading layer 33, the direction of magnetization of the reading layer 33 is aligned in the downward direction, and acts to mask the direction of magnetization of the recording layer 35 (front mask). The high temperature region is a region beyond the Curie temperature of the intermediate layer 34, and the exchange coupling force between the intermediate layer 34 and reading layer 33 is cut off. As a result, the direction of magnetization of the reading layer 33 is aligned in the upward direction of the reading magnetic field, and acts to mask the direction of magnetization of the recording layer 35 (rear mask). In the intermediate temperature region between the low temperature region and the high temperature region, by the exchange coupling force of the recording layer 35 and the reading layer 33 through the intermediate layer 34, the direction of magnetization of the recording layer 35 is transferred to the reading layer 33 (opening).

Thus, according to the MSR medium by the present applicant, since the direction of magnetization of the intermediate layer 34 can be aligned in the direction of reading magnetic field of several hundred Oe in the low temperature region, a front mask can be formed without using a large initializing magnet of several kOe. In the MSR medium forming a mask in the beam spot S as mentioned above, the mask forming range in the beam spot differs slightly depending on the direction of magnetic field applied when reproducing. As the mask forming range differs, the inclination of the edge of the reproduction signal varies. For example, when reproduced by applying a minus magnetic field in the MSR medium (FIG. 6A), at the moment of reading out the bit in the recording direction, the direction of magnetization of the intermediate layer 34 in the opening is the same direction as the reading magnetic field, and when a plus magnetic field is applied (FIG. 6B), it is reverse to the reading magnetic field. Due to this difference in the direction of magnetization, the front mask is formed at a position closer to the center of the beam spot S when a plus magnetic field is applied than when a minus magnetic field is applied. Therefore, the leading edge of the reproduction signal is steeper when a plus magnetic field is applied. On the other hand, the direction or magnetization of the reading layer 33 in the rear mask region is same as the direction of magnetization of the intermediate layer 34 in the opening when reading out the recording bit in the case of application of minus magnetic field, and is reverse in the case of application of minus magnetic field. Due to difference in the direction of magnetization, the rear mask is formed at a position closer to the center of the beam spot S when a minus magnetic field is applied than when a plus magnetic field is applied. Therefore, the trailing edge of the reproduction signal is steeper when a minus magnetic field is applied.

Accordingly, by applying a plus magnetic field upon output of leading edge and applying a minus magnetic field upon output of trailing edge, the inclinations of both edges are closer to symmetry. That is, by magneto-optical reproduction by changing over the reading magnetic field from plus magnetic field to minus magnetic field or vice versa in accordance with the detection of the leading and trailing edges of the obtained reproduction signal, a reproduction signal of high quality having small jitter in both edges can be obtained. Specific embodiments of the invention are described below.

First embodiment

Figure 7:
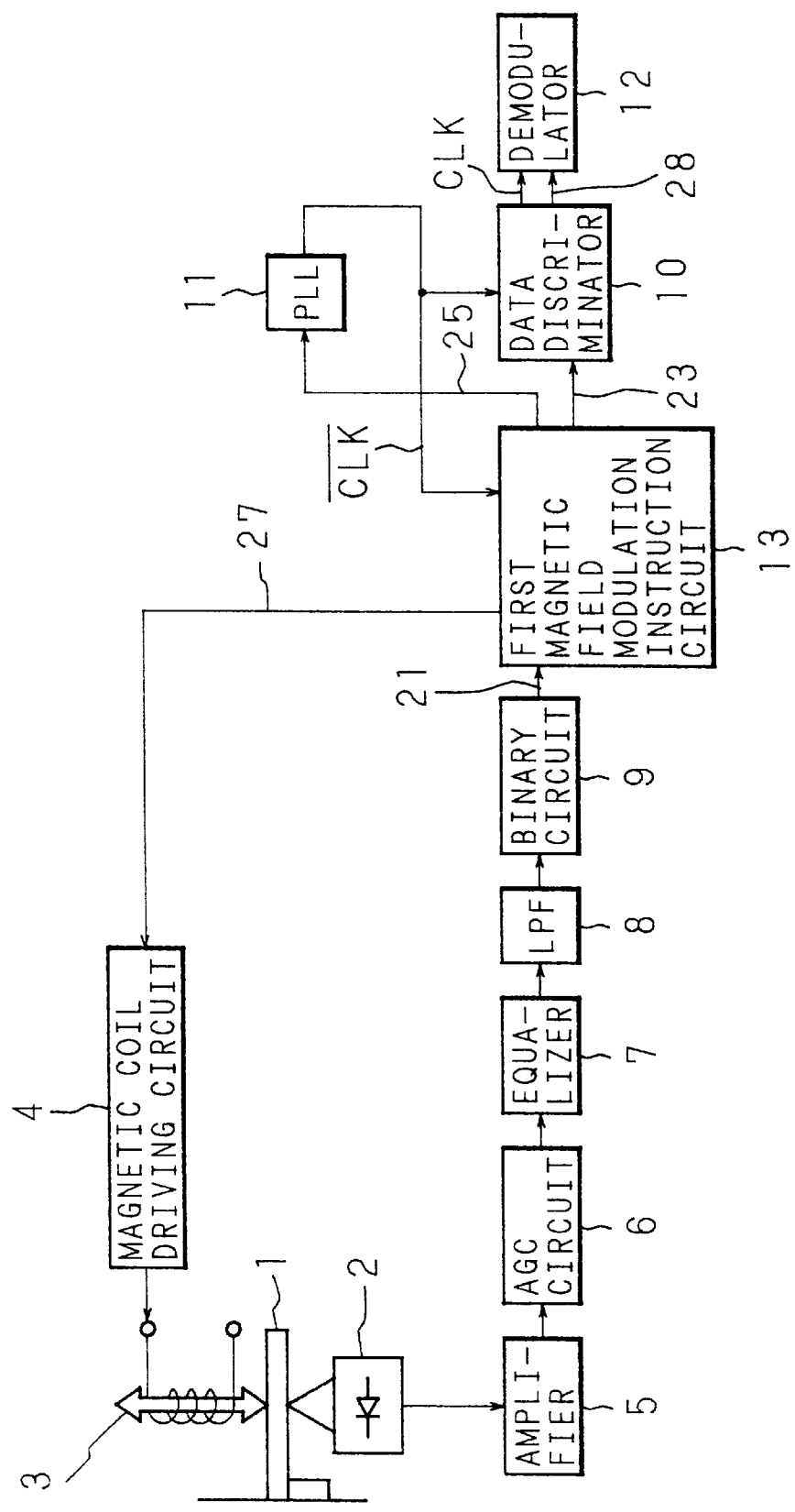
FIG. 7 is a block diagram showing a constitution of a magneto-optical recording apparatus in a first embodiment.
Figure 8:
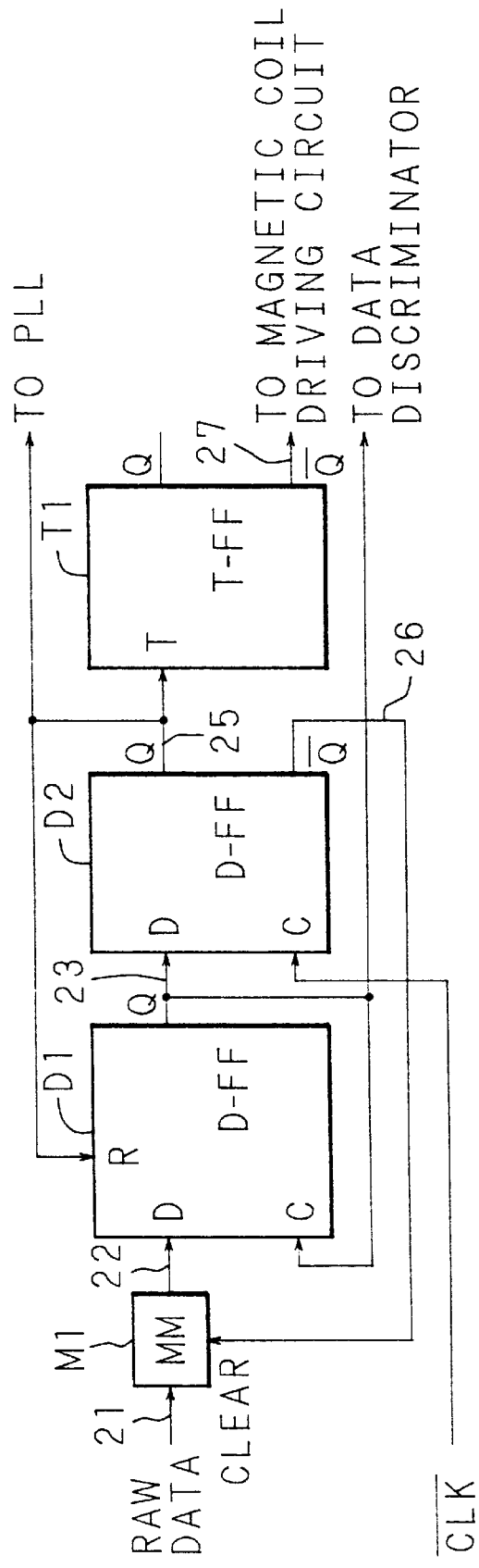
FIG. 8 is a circuit diagram showing the structure of a first magnetic field modulation instruction circuit.
Figure 9:
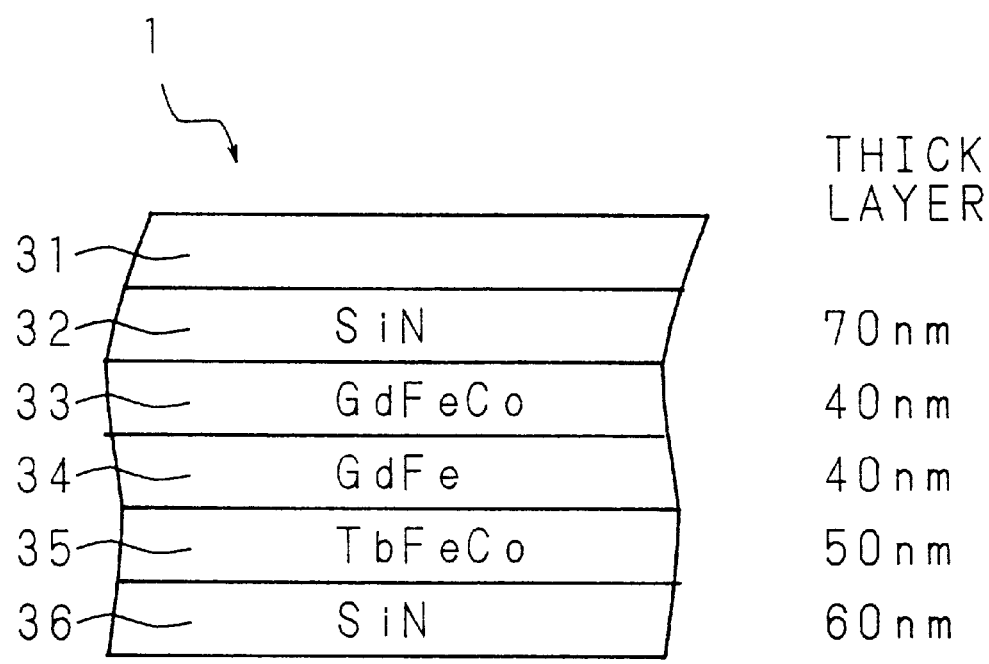
FIG. 9 is a film composition drawing of a magneto-optical disk used in embodiment of the invention.

FIG. 7 is a block diagram showing the constitution of a magneto-optical reading apparatus of the invention, and FIG. 8 is a structural circuit diagram of a first magnetic field modulation instruction circuit which is a feature of the invention. In FIG. 7, reference numeral 1 denotes a magneto-optical disk used in embodiment of the reading method of the invention. FIG. 9 is a film composition diagram of this magneto-optical disk 1.

As shown in FIG. 9, the magneto-optical disk 1 is formed by laminating a 70 nm thick base layer 32 of SiN, a 40 nm thick reading layer 33 of GdFeCo as first magnetic layer, a 40 nm thick intermediate layer 34 of GdFe as second magnetic layer, a 50 nm thick recording layer 35 of TbFeCo as third magnetic layer, and a 60 nm thick protective layer 36 of SiN, in this order on a substrate 31 of photo polymer glass (2P glass). These magnetic layers are laminated by the magnetron sputtering method.

The reading layer 33 is a transition metal magnetization dominant film, and has an easy axis for magnetization in the perpendicular direction, that is, the laminating direction. The intermediate layer 34 is a rare earth magnetization dominant film, which does not show compensation temperature until the Curie temperature, and has an easy axis for magnetization in the in-plane direction at room temperature. Over a predetermined temperature higher than the room temperature, the easy axis for magnetization changes from the in-plane direction to the perpendicular direction. The recording layer 35 is a transition metal magnetization dominant film, and has an easy axis for magnetization in the perpendicular direction. Supposing the Curie temperature of the reading layer 33, the intermediate layer 34, and the recording layer 35 to be Tc1, Tc2, and Tc3, the relation of Tc2<Tc1, Tc2<Tc3 is satisfied. Supposing the coercive force of the reading layer 33 and the recording layer 35 at room temperature to be Hc1 and Hc3, the relation of Hc3>Hc1 is satisfied. The magneto-optical disk 1 is same as the MSR medium proposed by the present applicant in Japanese Patent Application Laid-Open No. 7-244877 (1995), and description of its composition and manufacturing process is omitted.

In the thus constituted magneto-optical disk 1, a recording mark is formed by using (1, 7) RLL modulation code by the laser pulse magnetic field modulation recording system. The recording condition is the recording laser beam power of 11.0 mW and the recording magnetic field of 300 Oe.

As shown in FIG. 7, an optical head 2 is disposed at one side of the magneto-optical disk 1. The optical head 2 comprises a laser light source, an optical system for guiding the laser beam emitted from the laser light source, and converting means for converting a magneto-optical signal into an electrical signal. At other side of the magneto-optical disk 1, a magnetic coil 3 is disposed, and a reading magnetic field is applied in a predetermined direction in the magneto-optical disk 1 on the basis of a signal given from a magnetic coil driving circuit 4. The laser beam emitted from the optical head 2 irradiates the magneto-optical disk 1, and the reflected light is condensed, to detect the magneto-optical signal, and is converted into a reproduction signal which is an electrical signal.

The wavelength λ of the laser beam is 685 nm, and the numerical aperture NA of the objective lens is 0.55. The reproduction condition of the magneto-optical disk 1 is the reading laser beam power of 3.0 mW, and the reading magnetic field of 400 Oe. In this embodiment, the recording mark is reproduced by the mark edge system. The mark edge system is a recording/reproducing method of recording a mark in which the presence and absence of an edge of the recording mark corresponds to binary information 1 and 0. Thus, and information can be recorded at higher density as compared with the mark position system in which the presence and absence of recording mark correspond to 1 and 0.

The reproduction signal coming out from the optical head 2 is put in an amplifier 5 and amplified, and is sent out into an AGC circuit 6. The gain of the signal entering the AGC circuit 6 is adjusted, and is sent out into an equalizer 7, and the waveform is equalized. The equalized signal is sent out into an LPF 8, and high frequency noise is removed. The signal coming out from the LPF 8 is applied to a binary circuit 9 to be transformed into a binary value, and raw data 21 produced on the basis of the binary signal being applied to a first magnetic field modulation instruction circuit 13. The raw data 21 at this time is a pulse rising at the edge of the binary signal. In the first magnetic field modulation instruction circuit 13, an inverted edge synchronizing clock $\overline{CLK}$ is entered from a PLL 11, discriminating data 23 is given to a data discriminator 10, a PLL synchronizing signal 25 is given to the PLL, and a reading magnetic field modulation signal 27 is given to the magnetic coil driving circuit 4, respectively.

The circuit composition of the first magnetic field modulation instruction circuit 13 shown in FIG. 8 is described below. The raw data 21 is fed into a mono-multi circuit (MM) M1 as trigger signal, and a mono-multi signal 22 is given to a D input terminal of a first D flip-flop (D-FF) D1. The D flip-flop D1 gives an output signal of discriminating data 23 to its own clock terminal, D input terminal of a second D flip-flop D2, and data discriminator 10 (see FIG. 7). The D flip-flop D2 receives an inverted edge synchronizing clock $\overline{CLK}$ at its clock terminal, and sends an output signal of PLL synchronizing signal 25 to a reset terminal of the D flip-flop D1, T input terminal of a T flip-flop T1, and PLL 11 (see FIG. 7). An inverted output signal of the D flip-flop D2 is given to the mono-multi circuit M1 as a clear signal. An inverted output signal of the T flip-flop T1 is given to the magnetic coil driving circuit 4 (see FIG. 7) as a reading magnetic field modulation signal 27.

As shown in FIG. 7, the reading magnetic field modulation signal 27 issued from the first magnetic field modulation instruction circuit 13 is put into the magnetic coil driving circuit 4, and the magnetic coil 3 is driven corresponding to the reading magnetic field modulation signal 27. Thus, and the reading magnetic field to be applied to the magneto-optical disk 1 is controlled. On the other hand, discriminating data 23 issued from the first magnetic field modulation instruction circuit 13 is sent into the data discriminator 10, along with an inverted edge synchronizing clock $\overline{CLK}$, and separate data 28 and edge synchronizing clock CLK are sent out into a demodulator 12. The inverted edge synchronizing clock $\overline{CLK}$ is issued from the PLL 11 on the basis of the PLL synchronizing signal 25. The separate data 28 is demodulated in the demodulator 12.

Figure 10A:
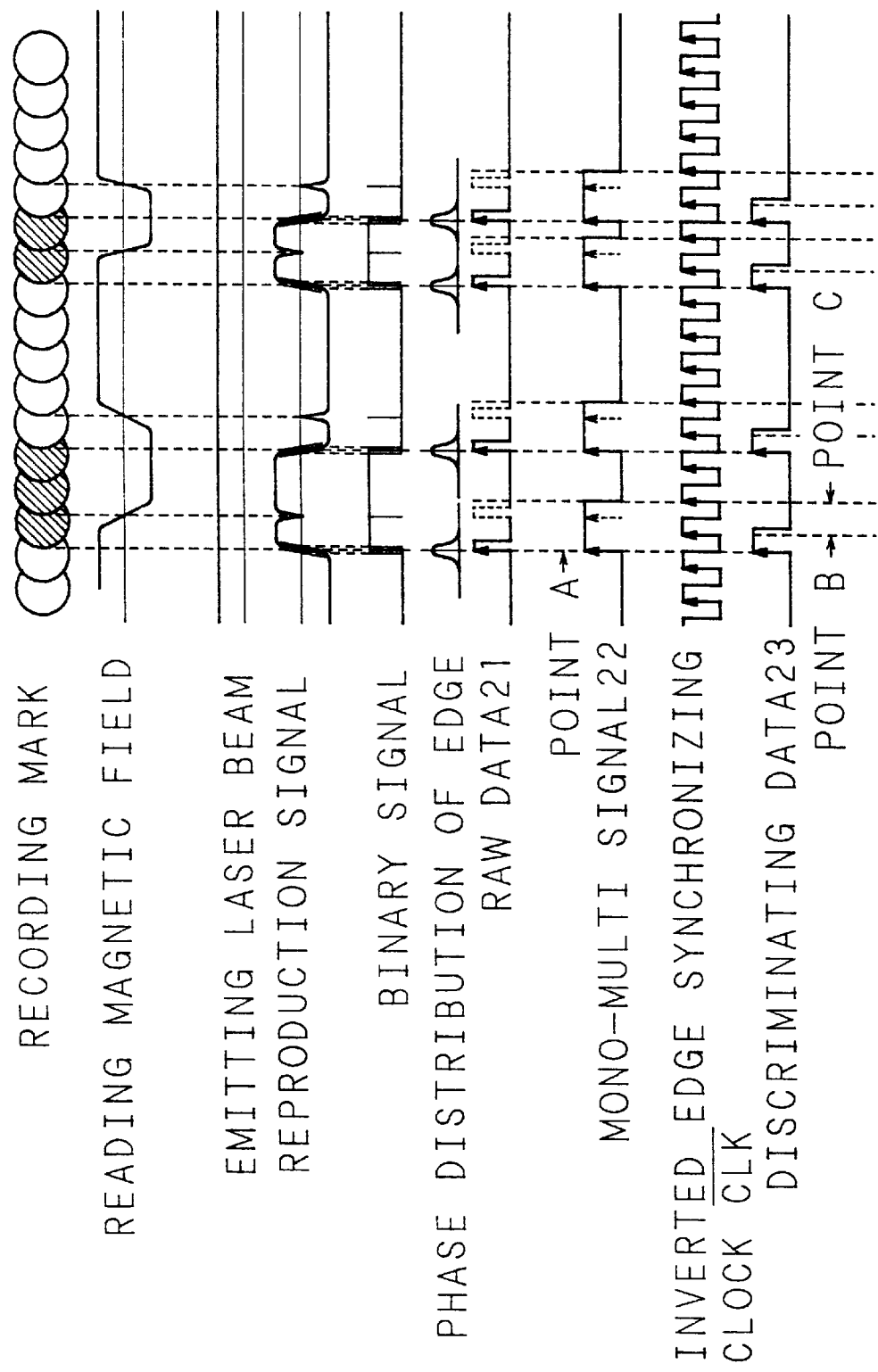
FIGS. 10A and 10B are operation timing charts in the first embodiment.
Figure 10B:
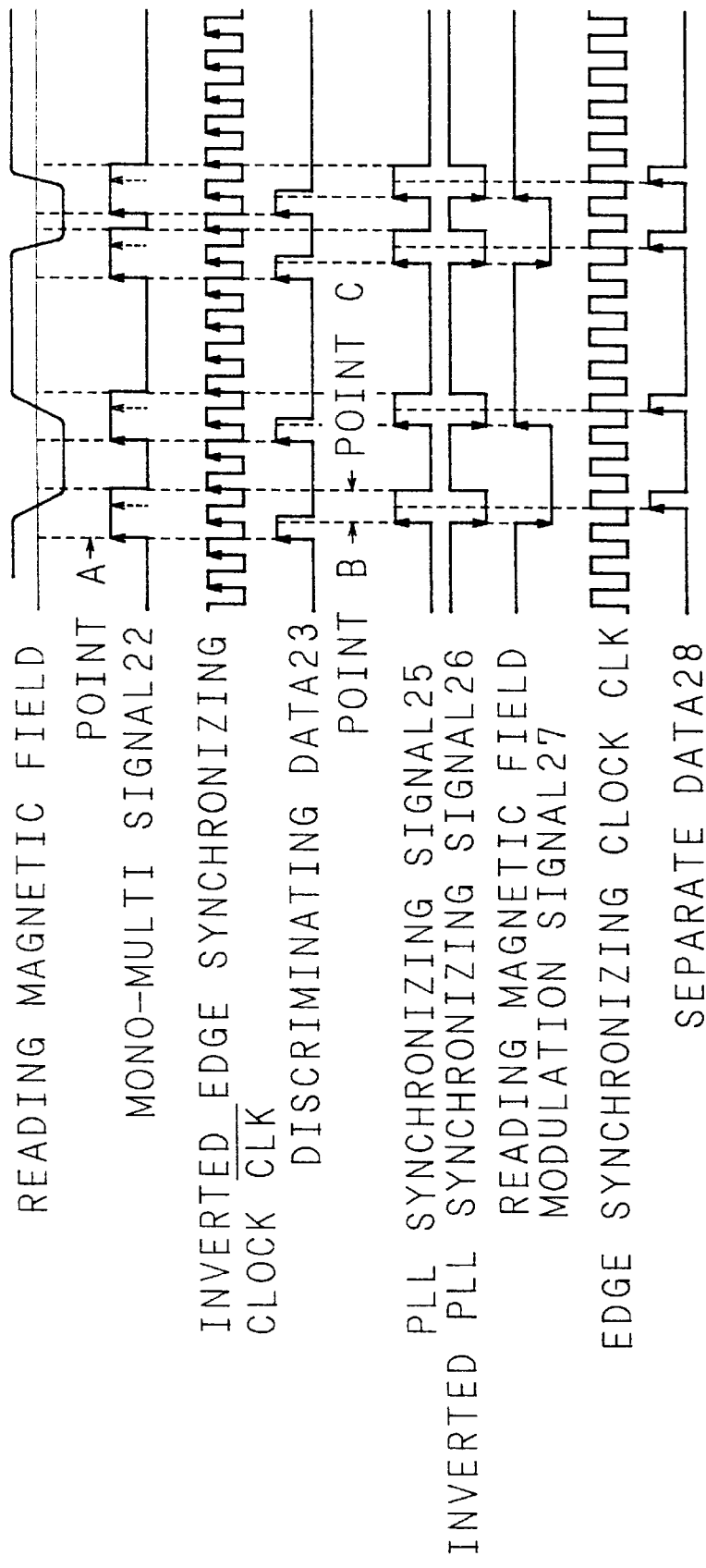

By using the thus composed reading apparatus, the operation of each circuit when reading the information recorded in the magneto-optical disk 1 is described below. FIGS. 10A and 10B are timing charts showing the raw data, the reading magnetic field modulation signal and separate data in the embodiment. Also, shown are the recording mark, the reading magnetic field waveform, and phase distribution of its edge. The recording mark shows, by hatching the bit, which direction of magnetization is the recording direction. Irradiating a laser beam of 3.0 mW to the magneto-optical disk 1, the magnetic coil is driven by the magnetic coil driving circuit 4, and first a plus magnetic field in the same direction as recording direction is applied at 400 Oe. The leading edge of the recording mark is read out by the optical head 2, and the raw data 21 starts up the pulse (point A) at the timing of the leading edge of the reproduction signal as shown in FIG. 10. As mentioned above, while applying a plus magnetic field, when the leading edge of reproduction signal is obtained, the reproduction waveform is steep and jitter is small.

The raw data 21 is put into the mono-multi circuit M1 as trigger signal, and a mono-multi signal 22 rises at point A as shown in FIG. 10, and is put into the first D flip-flop D1, and a discriminating data 23 rises. In the second D flip-flop D2, when the discriminating data 23 is H level (hereinafter called 'H'), and the inverted edge synchronizing clock $\overline{CLK}$ is also 'H', a PLL synchronizing signal 25 rises (point B). Herein, the edge synchronizing clock CLK and inverted edge synchronizing clock $\overline{CLK}$ are synchronized with the recording mark, and one recording mark corresponds to one clock, and the edge synchronizing clock CLK rises at the edge position of the recording mark. In a first F flip-flop F1, at the rise timing of the PLL synchronizing signal 25, a reading magnetic field modulation signal 27 rises, and the magnetic coil driving circuit 4 instructs a magnetic field modulation to the magnetic coil 3. The the reading magnetic field is modulated from the plus magnetic field to a minus magnetic field. At the same time, in the first D flip-flop D1, the reading magnetic field modulation signal 27 is given to reset, and the discriminating data 23 falls.

As shown in FIG. 10, when the discriminating data 23 entered in the second D flip-flop D2 is L level (hereinafter called 'L'), and the inverted edge synchronizing clock $\overline{CLK}$ is 'H', the PLL synchronizing signal 25 is 'L', and the inverted PLL synchronizing signal 26 rises (point C). At this time, the mono-multi circuit M1 is cleared, and a mono-multi signal 22 falls. As shown in FIG. 10, the reading magnetic field is modulated from the plus magnetic field to a minus magnetic field for the period of one clock after output of the reading magnetic field modulation signal 27. At point C, the magnetic coil 3 applies a minus magnetic field (-400 Oe) to the magneto-optical disk 1.

In this way, in accordance with the detection of the leading edge of the reproduction signal, the magnetic field is modulated from the plus magnetic field to a minus magnetic field. In this process of transition of inversion of the magnetic field, the magnetic field becomes zero at a specific moment. At this time, the amplitude of the reproduction signal is zero, and a gritty component is contained in the binary signal. Raw data 21 is produced, and the mono-multi signal 22 rises and the reading magnetic field modulation signal 27 becomes 'H'. However, since the mono-multi signal 22 maintains the state of 'H' from point A until point C when the inverted PLL synchronizing signal 26 raises, the gritty component is masked, and the reading magnetic field modulation signal 27 does not actually become 'H'. For example, in this embodiment, from the moment of output of the reading magnetic field modulation signal 27, the magnetic field becomes zero within substantially 0.5 clock, and the gritty component is formed. Since the mono-multi signal 22 is 'H' for the period of 1.5 clock after detection of the leading edge of the reproduction signal, faulty output due to gritty effect is prevented. Incidentally, the period until start of the modulation of magnetic field to the moment of zero magnetic field is 0.5 clock, and this period depends on the characteristic of the magnetic coil 3. Therefore, considering the period until occurrence of the gritty component, it is preferred to compose the circuit so that the mono-multi signal 22 may maintain 'H'.

On the other hand, the discriminating data 23 sent out from the first D flip-flop D1 is put into the data discriminator 10, and separate data 28 is sent out and is demodulated in the demodulator 12.

Detection of trailing edge is explained next. In the state of the application of the minus magnetic field, the trailing edge of the recording mark is read out, and, as shown in FIG. 10, the raw data 21 raises the pulse at the timing of the trailing edge of the reproduction signal. Thus, when obtaining the trailing edge of the reproduction signal, a minus magnetic field is applied, and the reproduction waveform is steep and the jitter is small. When the raw data 21 rises, as in the operation above, a PLL synchronizing signal 25 rises. A reading magnetic field modulation signal 27 falls at point B when a plus magnetic field is applied, and thereafter maintains the state of 'L', and becomes 'H' at the next rise timing of the PLL synchronizing signal 25 by this application of minus magnetic field. The magnetic coil driving circuit 4 instructs modulation of magnetic field to the magnetic coil 3, and the reading magnetic field is modulated from the minus magnetic field to a plus magnetic field.

In the process of transition of inversion of the magnetic field from minus magnetic field to plus magnetic field, there is a moment when the magnetic field becomes zero. At this time, the amplitude of the reproduction signal becomes zero, and gritty component is formed in the binary signal, and the reading magnetic field modulation signal becomes 'H'. However, same as in the above case of modulation from plus magnetic field to minus magnetic field, faulty output of reading magnetic field modulation signal 27 is masked by the mono-multi signal 22.

On the other hand, the discriminating data 23 sent out from the first D flip-flop D1 is given to the data discriminator 10, and separate data 28 is sent out, and is demodulated in the demodulator 12. In this way, by repeating the output of the reading magnetic field modulation signal 27 in accordance with the detection of the leading edge and the trailing edge of the reproduction signal, the magnetic field is applied in a direction advantageous for jitter at each edge.

In this embodiment, therefore, the reproduction signal having a steep inclination in both the leading edge and the trailing edge is obtained, and the edges of the reproduction signal waveform are close to symmetry in the front and rear positions, so that the reproduction characteristic may be enhanced.

In this magneto-optical reading apparatus, the circuit delay of the AGC circuit 6, equalizer 7 and LPF 8 may he large depending on the dimension of the minimum mark length and the linear velocity of the magneto-optical disk, and the period from reading of the reproduction signal by the optical head 2 until detection of edge may be longer. In such a case, a next edge may be already obtained when the reading magnetic field modulation signal 27 is issued, that is, modulation of reading magnetic field may not be done until the next edge. Accordingly, a magneto-optical reading apparatus for detecting the edge promptly, regardless of the circuit delay, if the circuit delay for data reproduction is large, is explained below.

Second embodiment

Figure 11:
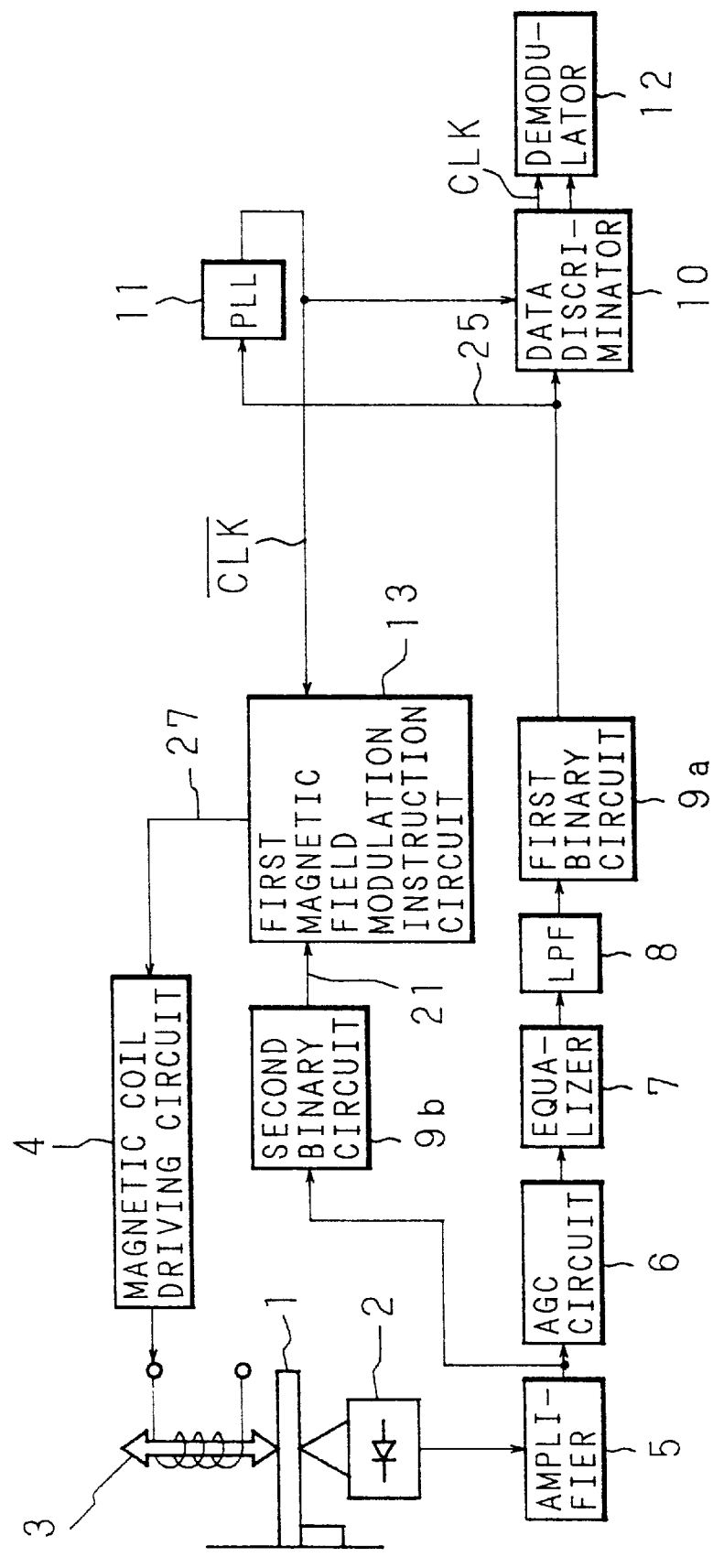
FIG. 11 is a block diagram showing a constitution of a magneto-optical recording apparatus in a second embodiment.

FIG. 11 is a block diagram showing a constitution of a magneto-optical reading apparatus in a second embodiment. As shown in FIG. 11, an optical head 2 is disposed at one side of the magneto-optical disk 1, and the reproduction signal being readout is amplified in an amplifier 5, and is put into an AGC circuit 6 and a second binary circuit 9b. The signal fed in the AGC circuit 6 is sequentially sent into an equalizer 7, an LPF 8, a first binary circuit 9a, a data discriminator 10, and a demodulator 12, and the data is reproduced. Incidentally, the first binary circuit 9a and the second binary circuit 9b have a similar circuit construction.

On the other hand, the signal fed into the second binary circuit 9b is put into a first magnetic field modulation instruction circuit 13. The first magnetic field modulation instruction circuit 13 has a similar circuit construction as in the first embodiment, and raw data 21 is given to a mono-multi circuit M1, and the edge of the reproduction signal is detected as shown in the timing chart in FIG. 10. A reading magnetic field modulation signal 27 is given to the magnetic coil driving circuit 4 for modulating the reading magnetic field. The other constitution of the magneto-optical reading apparatus and the function of these blocks are same as in the first embodiment, and same parts are identified with same reference numerals, and detailed description is omitted.

Thus, according to the second embodiment, same effects as in the first embodiment are obtained, and the reproduction signal is processed separately in the data reading route and edge detecting route after amplification, and the edge is detected promptly if the circuit delay of the reading route is large. Therefore the reading magnetic field can be modulated securely after detection of edge until next edge.

In the first and second embodiments, the period for masking the gritty component occurring due to inversion of magnetic field is 1.5 clock, and therefore the information to be recorded must have a code of d restriction of 1 or more, such as (1,7) RLL modulation code or (2,7) RLL modulation code. By eliminating this code limitation, the magneto-optical reading apparatus capable of modulating the magnetic field without the effect of a gritty component regardless of the modulation code is described below.

Third embodiment

Figure 12:
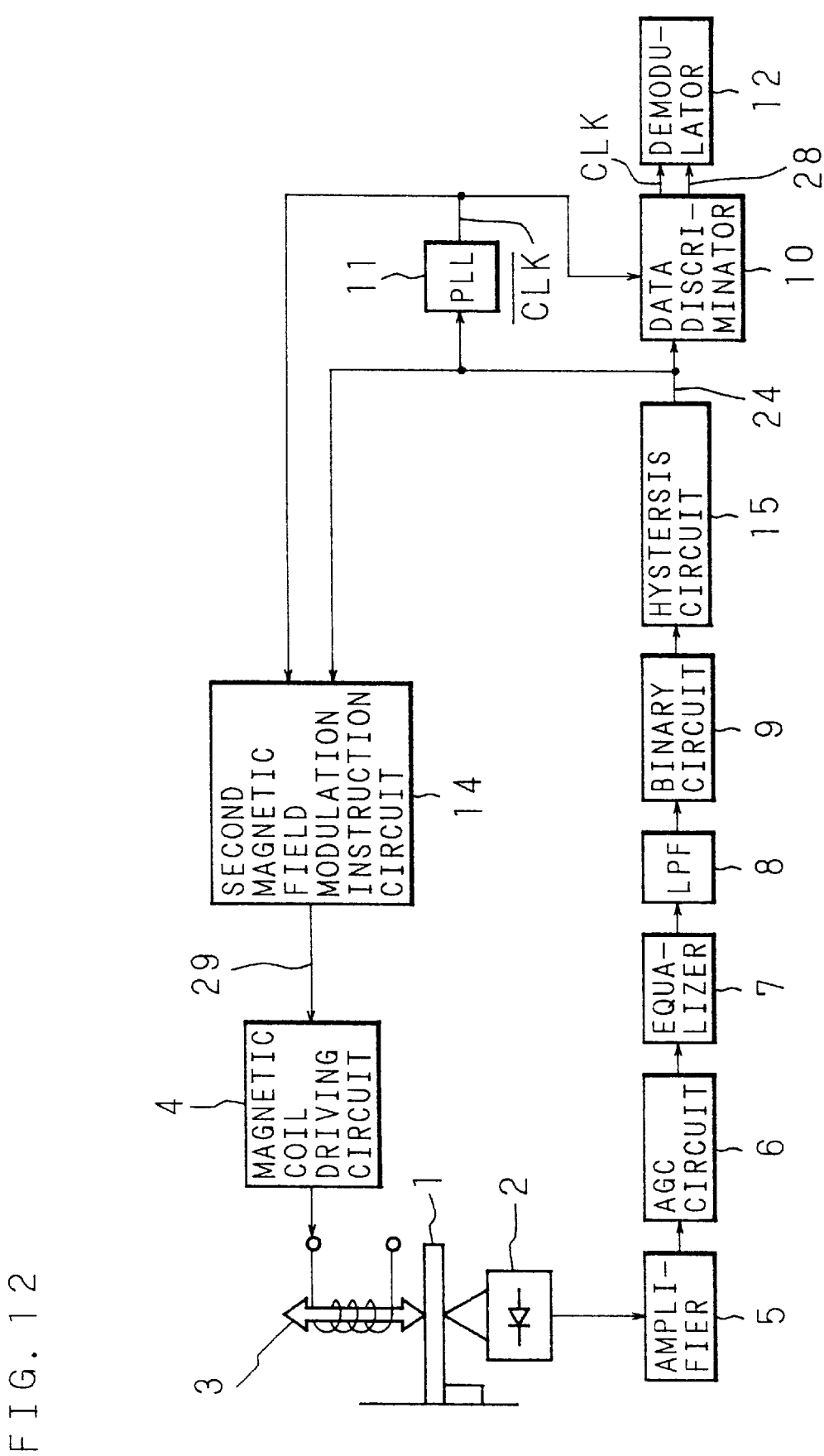
FIG. 12 is a block diagram showing a constitution of a magneto-optical recording apparatus in a third embodiment.

FIG. 12 is a block diagram showing the constitution of a magneto-optical reading apparatus in a third embodiment of the invention. In the diagram, reference numeral 1 is a magneto-optical disk capable of reproducing at MSR, and its film composition and magnetic characteristic are same as shown in the first embodiment. The reproduction signal being read out from the magneto-optical disk 1 is given to a binary circuit 9, and a binary signal issued from the binary circuit 9 is put into a hysteresis circuit 15 which is a feature of the third embodiment. In the hysteresis circuit 15, a gritty component occurring at the time of the inversion of the reading magnetic field is removed, and a shaped binary signal 24 is issued. The shaped binary signal 24 is given to a second magnetic field modulation instruction circuit 14 and a data discriminator 10. The second magnetic field modulation instruction circuit 14 receives the shaped binary signal 24 and inverted edge synchronizing clock $\overline{CLK}$, and gives a reading magnetic field modulation signal 29 to the magnetic coil driving circuit 4. The inverted edge synchronizing clock $\overline{CLK}$ is issued from a PLL 11 on the basis of the shaped binary signal 24. The magnetic coil 3 is driven in accordance with the reading magnetic field modulation signal 29, and the reading magnetic field to be applied to the magneto-optical disk 1 is controlled.

Figure 13:
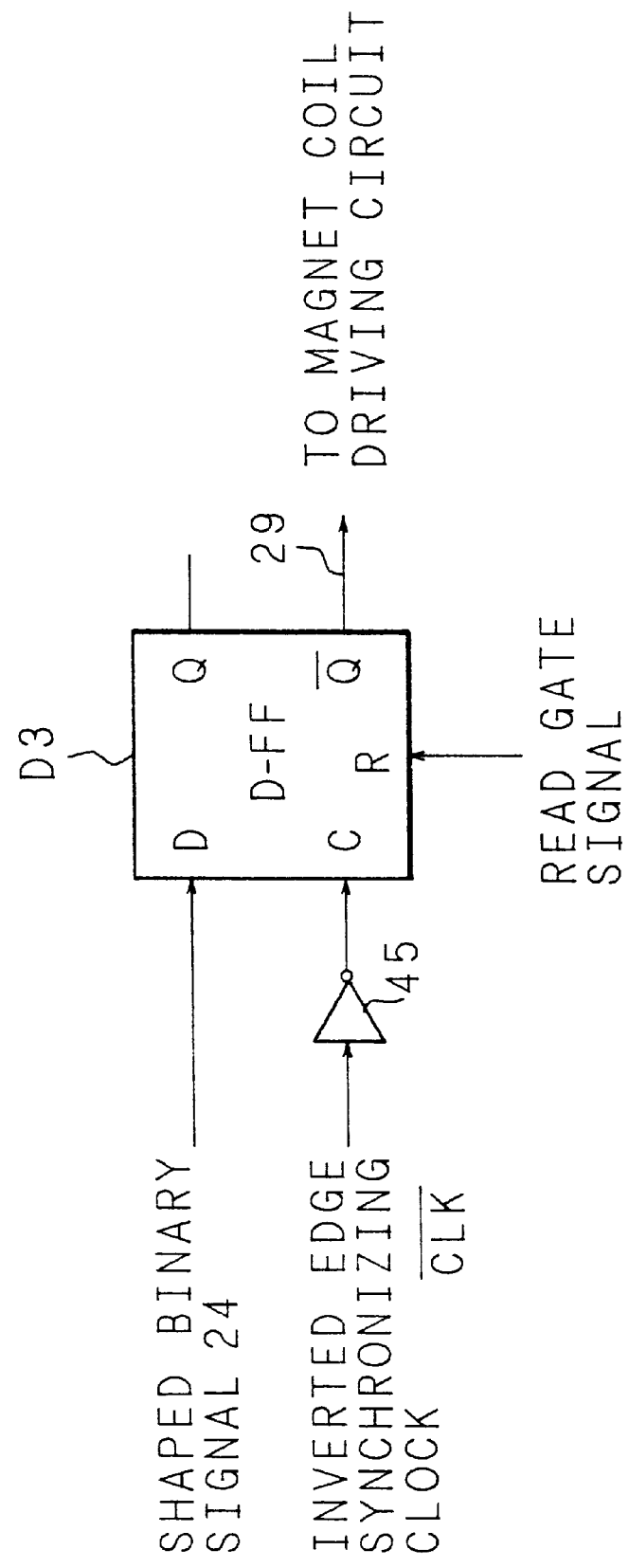
FIG. 13 is a circuit diagram showing the structure of a second magnetic field modulation instruction circuit.

FIG. 13 is a structural circuit diagram of the second magnetic field modulation instruction circuit. The shaped binary signal 24 issued from the hysteresis circuit 15 is given to the input terminal of a third D flip-flop D3, and an inverted edge synchronizing clock $\overline{CLK}$ issued from the PLL 11 is fed into an inverter 45. Its output, the edge synchronizing clock CLK is given to a clock terminal of the D flip-flop D3. An inverted output of the D flip-flop D3 is given to the magnetic coil driving circuit 4. At a reset terminal of the D flip-flop D3, a read gate signal described below is given.

On the other hand, in the data discriminator 10 receiving the shaped binary signal 24 (as shown in FIG. 12) from the hysteresis circuit 15, an inverted edge synchronizing clock $\overline{CLK}$ issued from the PLL 11 is entered, and separate data 28 and edge synchronizing clock CLK are sent out to the demodulator 12. The entered separate data is demodulated in the demodulator 12. The other constitution is same as in the first embodiment, and same parts are identified with same reference numerals, and explanations are omitted. The hysteresis circuit 15 is a known circuit used for the purpose of removing gritty component.

Figure 14:
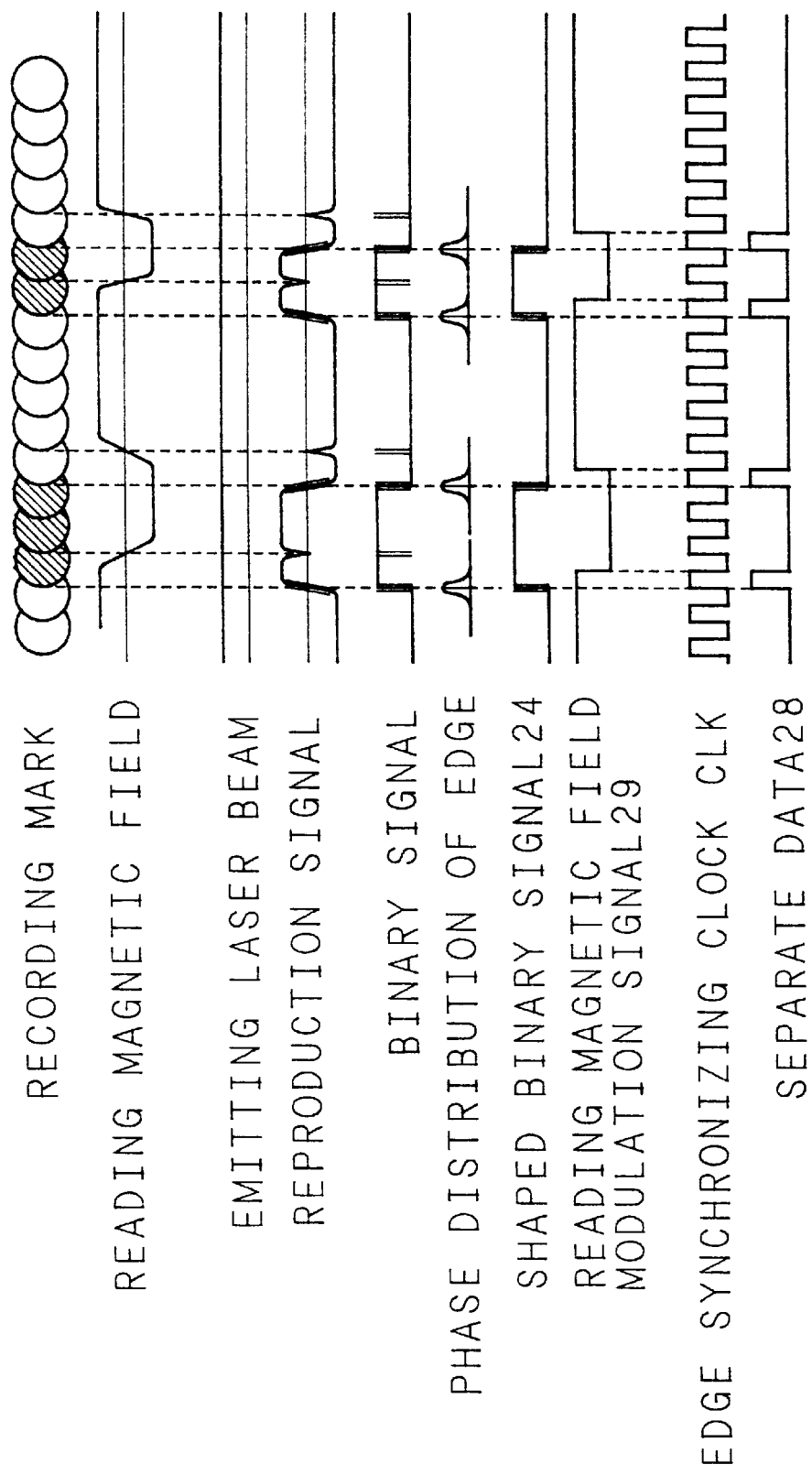
FIG. 14 is an operation timing chart in the third embodiment.

Using the thus constituted reading apparatus, the information recorded in the magneto-optical disk 1 is reproduced. FIG. 14 is a timing chart showing the binary signal, reading magnetic field modulation signal, and separate data in the third embodiment. Also shown are the recording mark, the reading magnetic field waveform, and the phase distribution of its edge. The recording mark shows the bit in the recording direction by hatching. Emitting a laser beam of 3.0 mW to the magneto-optical disk 1, the magnetic coil 3 is driven by the magnetic coil driving circuit 4, and first a plus magnetic field in the same direction as recording direction is applied at 400 Oe. The leading edge of the recording mark is read out by the optical head 2, and the binary signal and shaped binary signal 24 rises at the timing of the leading edge of the reproduction signal as shown in FIG. 14. As mentioned above, while applying a plus magnetic field, when the leading edge of reproduction signal is obtained, the reproduction waveform is steep and jitter is small.

The shaped binary signal 24 is given to the D flip-flop D3, and at the lowering timing of the edge synchronizing clock CLK, the reading magnetic field modulation signal 29 is set to L. The reading magnetic field modulation signal 29 is given to the magnetic coil driving circuit 4, and a magnetic field modulation is instructed to the magnetic coil 3, and the reading magnetic field is modulated from the plus magnetic field to a minus magnetic field. As shown in FIG. 14, after the output of the reading magnetic field modulation signal 29, the reading magnetic field is modulated from plus to minus until the trailing edge.

In this way, in accordance with the detection of the leading edge of the reproduction signal, the magnetic field is modified from the plus magnetic field to a minus magnetic field, and in this process of transition of inversion of magnetic field, the magnetic field becomes zero at a specific moment. At this time, the amplitude of the reproduction signal is zero, and a gritty component is contained in the binary signal, the reading magnetic field modulation signal 29 becomes 'H'. However, in the third embodiment, the gritty component has been removed by the hysteresis circuit 15. Since the binary signal is inverted in the level so that the same level may be maintained between the leading edge and trailing edge of the reproduction signal, the shaped binary signal 24 issued from the hysteresis circuit 15 is always free from gritty component. By removal of gritty component, faulty output of the reading magnetic field modulation signal 29 is prevented.

Next is explained the detection of trailing edge. In the state of application of minus magnetic field, the trailing edge of the recording mark is read out, and, as shown in FIG. 14, the shaped binary signal 24 falls at the timing of the trailing edge of the reproduction signal. Thus, when obtaining the trailing edge of the reproduction signal, a minus magnetic field is applied, and the reproduction waveform is steep, and the jitter is small. When the shaped binary signal 24 falls, at the falling timing of the edge synchronizing clock CLK, the reading magnetic field modulation signal 29 becomes 'H'. The reading magnetic field modulation signal 29 is given to the magnetic coil driving circuit 4 to instruct modulation of magnetic field to the magnetic coil 3, and the reading magnetic field is modulated from the minus magnetic field to a plus magnetic field. As shown in FIG. 14, after output of the reading magnetic field modulation signal 29, the reading magnetic field is modulated from plus to minus until the next leading edge.

In the process of transition of inversion of magnetic field from minus magnetic field to plus magnetic field, there is a moment when the magnetic field becomes zero, but same as in the above case of modulation from plus magnetic field to minus magnetic field, the gritty component is removed by the hysteresis circuit 15, and a faulty output of the reading magnetic field modulation signal 29 is prevented.

On the other hand, in the data discriminator 10 receiving the shaped binary signal 24 from the hysteresis circuit 15, output from the PLL 11 is given and separate data 28 is sent out, and is demodulated in the demodulator 12. In this way, by repeating output of reading magnetic field modulation signal 29 in accordance with the detection of leading edge and trailing edge of reproduction signal, the magnetic field is applied in a direction advantageous for jitter at each edge.

In the third embodiment, therefore, the reproduction signal having a steep inclination in both leading edge and trailing edge is obtained, and the edges of the reproduction signal waveform are close to symmetry in front and rear positions, so that the reproduction characteristic may he enhanced.

In the magneto-optical reading apparatus of the third embodiment, the circuit delay may be large depending on the dimension of the minimum mark length and the linear velocity of the magneto-optical disk, and modulation of reading the magnetic field may not be accomplished in the period from detection or edge until the next edge. Accordingly, a magneto-optical reading apparatus for detecting the edge promptly, regardless of the circuit delay, if the circuit delay for data reproduction is large, is explained below.

Fourth embodiment

Figure 15:
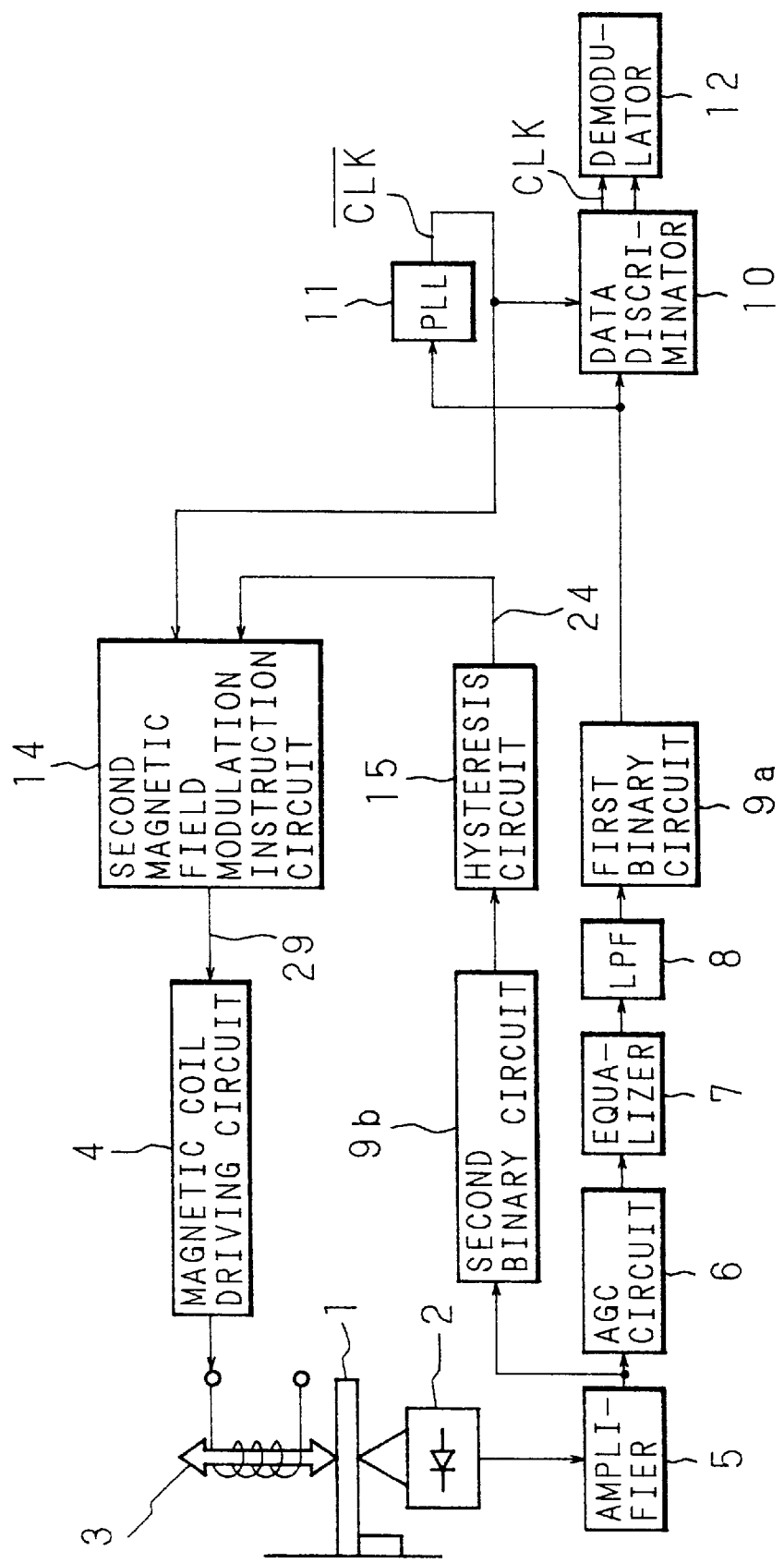
FIG. 15 is a block diagram showing a constitution of a magneto-optical recording apparatus in a fourth embodiment.

FIG. 15 is a block diagram showing a constitution of a magneto-optical reading apparatus in a fourth embodiment. As shown in FIG. 15, an optical head 2 is disposed at one side of the magneto-optical disk 1, and the reproduction signal being readout is amplified in an amplifier 5, and is put into an AGC circuit 6 and a second binary circuit 9b. The signal fed in the AGC circuit 6 is sequentially sent into an equalizer 7, an LPF 8, a first binary circuit 9a, a data discriminator 10, and a demodulator 12, and the data is reproduced. Incidentally, the first binary circuit 9a and second binary circuit 9b have a similar circuit construction.

On the other hand, the signal fed into the second binary circuit 9b is put into hysteresis circuit 15, and a gritty component is removed. The shaped binary signal 24 issued from the hysteresis circuit 15 is put into a second magnetic field modulation instruction circuit 14. The hysteresis circuit 15 and second magnetic field modulation instruction circuit 14 have same circuit constructions as in the third embodiment, and the shaped binary signal 24 is given to a D flip-flop D3. The edge of the reproduction signal is detected as shown in the timing chart in FIG. 14, and the reading magnetic field modulation signal 27 is given to the magnetic coil driving circuit 4, and the reading magnetic field is modulated. The other constitution of the magneto-optical reading apparatus and the function of these blocks are same as in the third embodiment, and same parts are identified with same reference numerals, a detailed description is omitted.

Thus, according to the fourth embodiment, same effects as in the third embodiment are obtained. The reproduction signal is processed separately in the data reading route and edge detecting route after amplification, and the edge is detected promptly if the circuit delay of the reading route is large. Therefore the reading magnetic field can he modulated securely after detection of the edge until the next edge.

Figure 16:
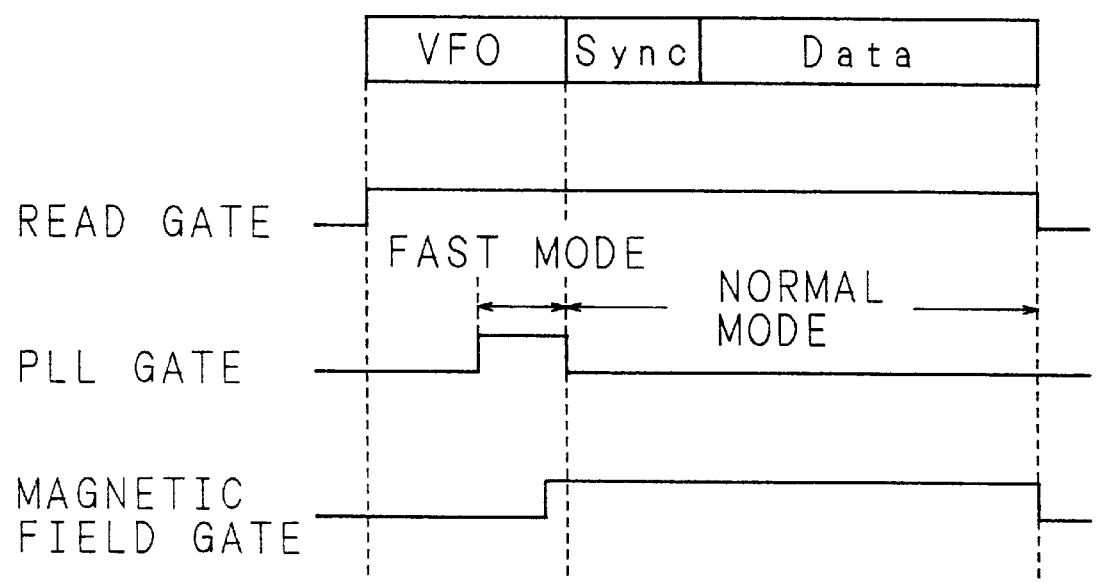
FIG. 16 is a timing chart showing the format and the timing of magnetic field modulation of a magneto-optical reading apparatus of the invention.

FIG. 16 is a timing chart showing the format applied to the magneto-optical reading apparatus of the invention, and the timing of magnetic field modulation. Part of the format structure of the magneto-optical disk 1 conforming to ISO is shown, and the MO (magneto-optical) region of the data portion includes a VFO region and a Sync region for controlling the synchronizing signal, and a Data region for recording the user information. A read gate is a signal for determining the timing for starting reproduction of the MO region, a PLL gate is a signal for determining the timing of start of the control of PLL, and a magnetic field gate is a signal for determining the timing of start of application of magnetic field. These signals are issued from the drive controller incorporated in the magneto-optical reading apparatus.

The timing for modulating the magnetic field explained in the first to fourth embodiments is described by referring to FIG. 16. When reproduction of the VFO region is started, the read gate signal becomes 'H' level, and the AGC is adjusted. After recognizing the recording mark and the space, the PLL gate becomes 'H' level substantially in the middle of the VFO region, and the PLL control is started in the fast mode of wide capture range. In the final portion of the VFO region, the PLL is controlled in the normal mode of narrow capture range, and the magnetic field gate is set to 'H' level, and the modulation is started. As a result, while the clock is sufficiently synchronized with the reproduction signal, the direction of magnetization when starting modulation of magnetic field can be determined from the recognized recording mark and space. When the sector is over, the read gate and magnetic field gate are set to L level, and the reading operation and magnetic field application are over. Incidentally, the magnetic field modulation may be always accomplished in accordance with the reproduction signal.

In the first to fourth embodiments, the recording mark is formed in the magneto-optical disk 1 by the mark edge system; but not limited to this, the invention may be also applied to the magneto-optical disk in which the recording mark is formed by the mark position system. In the case of mark position system, since the peak of reproduction signal corresponds to 1 and 0 of binary information, if the reproduction signal waveform is not symmetrical at the leading and trailing edges, an error occurs in determination of peak of reproduction signal, and jitter increases, but according to the foregoing embodiments, the leading and trailing edges of the reproduction signal waveform become closer to symmetry, and the quality of the reproduction signal is enhanced.

Also, in the first to fourth embodiments, the MSR medium capable of the reproducing RAD double mask is explained as an example; but not limited to this, the invention may be applied also to the MSR medium of RAD single mask reading method or FAD reading method. Furthermore in the MSR medium proposed in Japanese Patent Application Laid-Open Nos. 1-143041 (1989) and 3-93058 (1991), the same effects can be obtained by applying the method of the invention.

Thus, in the invention, since the reading magnetic field is modulated in accordance with the edge detection by detecting the leading edge and trailing edge of the obtained waveform of reproduction signal, the magnetic field can he applied in a direction advantageous for jitter in both the leading edge and the trailing edge. As a result, the waveform of the reproduction signal is steep in inclination of the leading and trailing edges and substantially symmetrical. Thus, the reproduction signal of small jitter and high quality is obtained. In the process of transition of magnetic field inversion, since the fluctuation of the reproduction signal at the moment of zero magnetic field is masked, the edges of the reproduction signal can be detected accurately, and the invention achieves excellent results.

As the invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

We claim:

1. A reading method of magneto-optical recording medium, comprising the steps of:

applying a magnetic field to a magneto-optical recording medium in which data is recorded;

emitting a light beam to the region where the magnetic field is applied to read out a reproduction signal corresponding to the data; and obtaining the data from the reproduction signal, wherein the magnetic field to be applied is modulated on the basis of the reproduction signal and the modulation of the magnetic field changes the direction of the magnetic field upon each of a leading edge and a trailing edge of the waveform of the reproduction signal being read out.

2. The reading method of magneto-optical recording medium according to claim 1, wherein the fluctuation of the reproduction signal occurring on the moment of zero magnetic field of the applied modulation magnetic field is masked when detecting the leading edge and the trailing edge.

3. A reading method of magneto-optical recording medium, comprising the steps of:

emitting a light beam by a relative move with a magneto-optical recording medium in which data is recorded so as to cause a temperature distribution in the moving direction in a spot of the light beam;

applying a magnetic field to mask the data in a predetermined region in the spot and reading out a reproduction signal from the remaining region in the spot; and obtaining the data from the reproduction signal;

wherein the magnetic field to be applied is modulated on the basis of the reproduction signal, and the modulation of the magnetic field changes the direction of the magnetic field upon each of a leading edge and a trailing edge of the waveform of the reproduction signal being read out.

4. The reading method of magneto-optical recording medium according to claim 3, wherein the region where data is masked is a lower temperature region and a part of higher temperature region in the spot in the step of reading out the reproduction signal, and the reproduction signal is read out from the remaining higher temperature region.

5. The reading method of magneto-optical recording medium according to claim 3, wherein the fluctuation of the reproduction signal occurring on the moment of zero magnetic field of the applied modulation magnetic field is masked when detecting the leading edge and the trailing edge.

6. A reading apparatus of magneto-optical recording medium, comprising:

a magnetic field applying means for applying a magnetic field to a magneto-optical recording medium in which data is recorded;

an optical head for emitting a light beam, and condensing the reflected light of the light beam reflected on the magneto-optical recording medium and converting into a reproduction signal corresponding to the data;

an edge detecting circuit for receiving the reproduction signal obtained from the optical head and detecting a leading edge and a trailing edge of the wave form of the reproduction signal; and a magnetic field modulation instruction circuit for giving an instruction signal for instructing modulation of the magnetic field upon each of a leading edge and a trailing edge to the magnetic field applying means.

7. The reading apparatus of magneto-optical recording medium according to claim 6, wherein the magnetic field modulation instruction circuit includes a circuit for receiving a signal from the edge detecting circuit, and generating a signal for masking the fluctuation of the reproduction signal occurring on the moment of zero magnetic field of the applied modulation magnetic field.

* * * * *